US009805404B2

(12) United States Patent
Sanfins Milagres

(10) Patent No.: US 9,805,404 B2
(45) Date of Patent: Oct. 31, 2017

(54) SYSTEM AND PROCESS FOR HIERARCHICAL MULTI-LEVEL SEGMENTATION AND ESTIMATE REUSE REQUEST

(71) Applicant: Nuno Miguel Sanfins Milagres, Vila Real (PT)

(72) Inventor: Nuno Miguel Sanfins Milagres, Vila Real (PT)

(73) Assignee: VORTAL—COMÉRCIO ELECTRÓNICO, CONSULTADORIA E MULTIMÉDIA, S.A., Porto (PT)

( * ) Notice: Subject to any disclaimer, the term of this patent is extended or adjusted under 35 U.S.C. 154(b) by 615 days.

(21) Appl. No.: 14/153,835

(22) Filed: Jan. 13, 2014

(65) Prior Publication Data

US 2014/0195367 A1 Jul. 10, 2014

Related U.S. Application Data

(63) Continuation-in-part of application No. PCT/IB2012/053583, filed on Jul. 12, 2012.

(30) Foreign Application Priority Data

Jul. 12, 2011 (PT) ........................................ 105805

(51) Int. Cl.
*G06Q 30/06* (2012.01)
*G06Q 10/08* (2012.01)
(Continued)

(52) U.S. Cl.
CPC ....... *G06Q 30/0611* (2013.01); *G06Q 10/063* (2013.01); *G06Q 10/087* (2013.01);
(Continued)

(58) Field of Classification Search
CPC .......................................... G06Q 30/06–30/08
(Continued)

(56) References Cited

U.S. PATENT DOCUMENTS

2001/0042039 A1* 11/2001 Rupp ................. G06Q 30/0641
705/37
2004/0210510 A1* 10/2004 Cullen et al. ................... 705/37

OTHER PUBLICATIONS

International Search Report, dated Dec. 4, 2012 in connection with PCT International Application No. PCT/IB2012/053583, filed Jul. 12, 2012.
(Continued)

*Primary Examiner* — Ethan D Civan
*Assistant Examiner* — Ming Shui
(74) *Attorney, Agent, or Firm* — John P. White; Cooper & Dunham LLP

(57) ABSTRACT

The present disclosure concerns the hierarchical splitting of large datasets by multi-level segmentation and providing a system and method for enabling requests of reuse of the values of previously estimated nodes of said hierarchy. This is applied in making connections between different suppliers in a complex hierarchical multi-level chain of purchase items, facilitating the communication of request for quotes and respective responses. The disclosure allows higher level bidders to traverse dense hierarchical multi-level chains of purchasing data, re-using existing estimates and quotes, allowing quicker processes and more efficient use of resources.

The system comprises a Request for Quote module (RFQ Module), an estimate module (Estimate Module) and a Request for Quote reply module (RFQ Reply Module), and a module for storing and/or communicating existing estimates and quotes (Rides Module) across hierarchical levels in the purchase process.

17 Claims, 18 Drawing Sheets

(51) Int. Cl.
   *G06Q 10/06* (2012.01)
   *G06Q 30/02* (2012.01)
   *G06Q 30/08* (2012.01)
(52) U.S. Cl.
   CPC ......... *G06Q 30/0283* (2013.01); *G06Q 30/06* (2013.01); *G06Q 30/08* (2013.01)
(58) Field of Classification Search
   USPC .............................................. 705/26.1–27.2
   See application file for complete search history.

(56) References Cited

OTHER PUBLICATIONS

Written Opinion of the International Searching Authority, dated Dec. 4, 2012 in connection with PCT International Application No. PCT/IB2012/053583, filed Jul. 12, 2012.

\* cited by examiner

SYSTEM AND PROCESS FOR HIERARCHICAL MULTI-LEVEL SEGMENTATION AND ESTIMATE REUSE REQUEST

CROSS-REFERENCE TO RELATED APPLICATIONS

This application is a continuation-in-part of PCT International Application No. PCT/IB2012/053583, filed Jul. 12, 2012, claiming priority of Portuguese Patent Application No. 105805, filed Jul. 12, 2011, the contents of each of which are hereby incorporated by reference in their entirety.

TECHNICAL FIELD

The present disclosure concerns the hierarchical splitting of large datasets by multi-level segmentation and providing a system and method for enabling requests of reuse of the values of previously estimated nodes of said hierarchy.

DISCLOSURE

In complex modern purchasing procedures, namely in large-scale building, aerospace or complex systems projects, it is perfectly normal that the items being put up for quotation may reach thousands in number, and hundreds, or even thousands, in type/make.

These kinds of procedures are naturally very challenging and purchasing optimizations are increasingly more and more difficult, as the size of the operation increases.

On one hand, the detail at which a project is specified has been and will continue to increase—reducing uncertainty, and enabling sounder decisions, both in the purchasing and construction phases.

On the other hand, the increase in specification detail has multiplied the number of items being put up for bidding. This creates complexities which increase at a worse than linear fashion. For example, the possible combinations/arrangements of items have increased exponentially, whether being it grouping of items for bidding, planning, construction or follow-up. These items may be products as well as services, which a further complication as the referred groupings may occur in parallel for products in services, or not at all.

Further, mostly for economic reasons, there is a much higher flexibility required from the supplier companies involved in these processes, where previous first bidding process structures are increasingly difficult to adapt to a second bidding process structure. This may mean that a specific supplier, which was an integrator of other sub-suppliers in a bidding process, may well be a sub-supplier of one of these other suppliers in the next bidding process. Different suppliers may join together, disband or even form different groupings depending on the opportunity.

All this creates much increased combinatorial problems. In this respect, what was initially possible by simple visual inspection or project common knowledge, was soon delegated to long tables, whether spreadsheets or databases.

Currently, the project dimensions and specification level no longer permit further significant optimizations even by these current state-of-the-art methods.

In fact, efficiency requirements, whether for economic, environmental or competitive reasons, do require unprecedented optimization levels, which are now ironically excessively difficult to attain because of the above stated complexities.

The present disclosure seeks to address this issue by providing a degree of optimization of these complex structures by means of a system and its respective method of operation.

One of the objectives of this disclosure emerges from the realization that in a multi-bidder setting, a number of sub-bidders may in fact produce multiple bids, each for one of the top-bidders involved. Logically, producing bids always entails a cost, even if an opportunity cost, but most of the times producing an estimate is a considerable real-life cost, involving specialized teams and usually extensive resource and supplier verifications.

If a sub-bidder is biding within a specific procedure, they could re-use the estimating effort in order to produce similar bids for other top-bidders. This, which is apparently simple, is considerably difficult in modern day purchasing processes.

One of the objectives of the present disclosure is to provide a system that addresses this need, in particular in highly complex purchasing processes.

FIG. 1 describes a typical purchasing process where a buyer 10 prepares an opportunity dossier 11, hereby designated buyer dossier A, which comprises a list of all items being put up for quotation. The buyer 10 will then issue a Request for Quote A (RFQA) 12 based on the buyer dossier A 11. The RFQ will usually be issued openly to the public or by a number of closed invitations. A number of bidders, in this case $1^{st}$ level bidders 20, 28, 29 receive the RFQA 12. They may choose to bid or not. The buyer may open the bidding to all items put up for purchase or may restrict bidding by specific bidders or groups of bidders to specific groups or lots of items or even may create restrictions on bidding to single items.

FIG. 2 describes a typical purchasing process where one of the $1^{st}$ level bidders 20 has chosen to reply, with a quote/estimate, by a Response to the RFQA 23, to the buyer 10. The buyer 10 may well receive further responses and then select the most appropriate bid for purchase.

FIG. 3 describes a typical purchasing process where a $1^{st}$ level bidder 20 chooses to delegate/subcontract two parts of the original Buyer Dossier A 11 by creating two sub-dossiers, Buyer Dossier A1 21 and Buyer Dossier A1 26. Typically, these will not overlap but may not cover the full Buyer Dossier A 11 as the $1^{st}$ level bidder 20 may choose to provide a part of the buyer dossier themselves and not subcontract.

Typically, a supplier may choose to split a number of items, if for example this is convenient for subcontracting or for added accuracy in producing estimates. These split items will carry over to lower level bidders and are another cause of complexity of these processes. Typically, items will not be merged as this creates issues to upper level bidders as this may hinder item-level comparisons, but is nevertheless possible.

FIG. 4 describes a typical purchasing process where a $1^{st}$ level bidder 20 issues a Request for Quote A1 21 based on a Buyer Dossier A1 21 to a $2^{nd}$ level bidder 30. The process is highly hierarchical and multiple levels are common, almost mandatory, for efficient estimating and competitive prices. The number of levels has no a priori limits and will mostly vary with the complexity and size of the purchase.

FIG. 5 describes a typical purchasing process where the bidders, reversing the RFQ order, now respond by issuing quotes/estimates to the upper levels. A bidder will typically aggregate the estimates from a lower-level, add the estimate price for the items they choose to supply directly, and apply corrections, discounts, margin calculations to produce a final estimate which is then sent to the next upper level.

FIG. 6 describes a typical purchasing process where $2^{nd}$ level bidder 30 receives two Requests for Quote A1 22, 25 from two different first level bidders 20, 28 concerning the same purchasing process initiated by a buyer. This may simply happen if the $2^{nd}$ level bidder is particularly active, competitive or cheap, so that they are considered for quotation by both $1^{st}$ level bidders 20, 28 in this case.

FIG. 7 describes the follow-up to the typical purchasing process in FIG. 6 where the $2^{nd}$-level bidder responds to the two Request for Quotes A1 33, 34 by sending two responses with quote/estimates to A1 33, 34. The cost in producing the first of these estimates can be offset when producing the second estimate. It this case, a connection, a potential data connection hereby referred as a Potential Ride 41, could be established, avoiding duplication of work and information.

FIG. 8 shows how such connection could be established, when the $2^{nd}$ level bidder recognizing the duplication simply re-issues the previous RFQA1 response 33 to the other $1^{st}$ level bidder 28, establishing a data connection hereby referred a Request for Quote Ride 42. Nevertheless, simple as this may seem, in fact is highly improbable in the prior art previous to the current disclosure. The reasons are straightforward. For one, the $1^{st}$ level bidders 20, 28 will probably have split the items in the Buyers Buyer Dossier A 11 in different ways so that the $1^{st}$ level Buyer Dossiers A1 21, 25 are rather different, therefore rendering very difficult, or even impossible, the re-use of the previous quote/estimate. Furthermore, these kind of purchasing processes have strict confidentiality requirements, whether by regulation, whether by commercial interests. So, for this reason, a $2^{nd}$ level bidder 30 will not normally be aware of the existence of other $1^{st}$ level bidders 28 and thus will not be able to take the initiative of forwarding a previously produced estimate/quote. This may happen if the other $1^{st}$ level bidder 28 happens to somehow find a $2^{nd}$ level bidder 30 which has already produced a bid in this purchasing process, which is exceedingly infrequent and difficult, again because of confidentiality and commercial issues.

Typically the $2^{nd}$ level bidder changes an attribute in RFQ A1 33 to mark it as accepting rides, though restrictions may be applied. By default, it is 'automatic'—all $1^{st}$ level bidders may access every detail—including identification of the $2^{nd}$ level bidder 30 and estimate details including pricing—and may use to create a RFQ A Response without $2^{nd}$ level bidder 30 intervention. Alternatively, the $2^{nd}$ level bidder 30 may change an attribute in RFQ A1 33 to mark it as accepting rides, but in this case some or all of the information in these will be 'private', such that the identification of the $2^{nd}$ level bidder 30 and/or the estimate details, including pricing, may be kept from being visible without $2^{nd}$ level bidder 30 explicit agreement.

FIG. 9 shows how such connection could be established in an improved way, which is part of the present disclosure. The $2^{nd}$ level bidders are able, when responding to a RFQ, to issue the same response, a RFQ Ride 42, to a database, hereby referred as Ride Database 40.

This way, by initiative of other $1^{st}$ level bidders 28, the previously prepared response may be made available, by simple lookup in the appropriate database 40. This way, the $1^{st}$ level bidders 28 are always given an opportunity to request quotes from previously engaged $2^{nd}$ level bidders 30.

Furthermore, the $1^{St}$ level bidders will also be able to verify what was the scope of these previously prepared estimates/quotes and may freely choose to segment the buyer dossier in a way that maximizes the chance to reuse these previous quotes/estimates.

Typically, the $1^{st}$ level bidder 28 will remain anonymous to the $2^{nd}$ level bidder 30 until this point, when it requests the RFQ Ride 42, thus complying with the confidentiality requirements set out above.

In the present disclosure, the buyer 10 and upper-level bidders 20, 28 may optionally disallow the Ride mechanism, but for efficiency purposes this should, at most, only be done in a part of the buyer dossiers, thus preferably enabling the Ride mechanisms, even if only partially.

In the present disclosure, the $2^{nd}$ level bidder 30, issuer of the RFQ Ride 42, may also choose to make the data connection RFQ Ride 42 automatically available, so that other $1^{st}$ level bidders 28 may immediately receive the RFQ A1 Response 33, or may impose specific conditions. The $2^{nd}$ level bidder 30 may also choose to 'manually' approve the RFQ Ride 42 every time it is requested by another $1^{st}$ level bidder. The $2^{nd}$ level bidder 30 may also choose to 'manually' review the quoted/estimated price before enabling the RFQ Ride 42 connection.

As is clear from the above, the hierarchy in which an buyer dossier is split is decisive on the re-use possibilities of previous estimates/quotes. The present disclosure addresses this namely by allowing each level of the bidding process to create its own items splits and by typically allowing all upper levels to lookup into these previously split and estimated items.

As should also be clear from the above explanations, the present disclosure does not replace the purchasing process of the other $1^{st}$ level bidders 28. These will, and in fact should, complete the normal purchasing steps: verifying suppliers' reputation, compliance with requirements, competitiveness of price quotation, and so on. The present disclosure namely allows making connections between different suppliers in a complex hierarchical multi-level chain of purchase items, facilitating the communication between these and re-use of previous calculations, by creating and managing data structures, also complex hierarchical multi-level, for this purpose. The disclosure allows higher level bidders to traverse dense hierarchical multi-level chains of purchasing allowing quicker processes and more efficient use of resources.

FIG. 10 describes a much simplified Buyer Dossier A, namely in its hierarchical structure for illustrative purposes. In this case, purchase items A were split into two sub-bids A1 and A2 which were then subsequently taken by a number of sub-sub-bidders. A second top-level bidder for the same purchasing process, bidding for the same items A as in A', was able to re-use the previously available estimate/quote A1 by establishing the RFQ Ride 42 connection. A1 may have a number of sub-items which may also be put up for bidding again.

FIG. 11 shows a similar connection but occurring at a lower-level in the hierarchy. In this case, an estimate sub-items of A1 were re-used into an estimate sub-items of A1' by establishing the RFQ Ride 42 connection.

FIG. 12 shows a much more typical situation, where the RFQ Ride 42 connections are multiple and occur at multiple hierarchical levels:

A2 estimate reused as an A2' estimate
  A3 sub-item estimates reused as A3' sub-item estimates
  A1 sub-item estimates reused an A1' estimate This figure shows how, namely for A1 items, a different bidder maybe even re-use previously prepared estimates from different hierarchical levels, in this specific case dispensing with intermediate bidder levels.

FIG. 13 shows a purchasing process of the system according to the disclosure whereby it is shown how the item classification procedure 51, 52 at each bidding level of the process, automatically creates the above described multiple hierarchical buyer dossiers which then enable the re-use of estimates/quotes. This classification may happen at both item and lot groupings such that lots or items have been previously classified and thus automatically segmented within the purchasing process.

As previously indicated, any of the above embodiments may have more than 2 bidding levels, as simply illustrated in the figures, with further levels extending the described functionalities by further delegating and/or splitting of the bidding items and consequent quote/estimate aggregations.

Also, the RFQ Ride Connections 42 maybe established between more than 2 top-level bids, as simply illustrated in the figures, connecting multiple top-level bidders and sub-bidders.

It is then recognizable the factors that allow the system to create the RFQ Ride Connections 42 with significant efficiency advantages include one or more of the following:

Buyer dossier items are linked from buyer to all the bidding levels.

Segmentation of buyer dossier items can and most of times happens at each level of the bidding structure.

At least, the indication of the existence of a previous bid and respective items is made available to upper-level bidders.

This is provided by a hierarchical RFQ Ride database 40 which can be freely looked up by those upper-level bidders RFQ Ride Connections 42 may happen from any hierarchical level to any hierarchical level.

RFQ Ride Connections 42 may be fully automatic or partially or fully 'manual', where price estimates/quotes may be automatically forwarded or may imply a degree of human intervention.

A RFQ Ride Connection 42 may even be established between multiple top-level bids which are not yet submitted to the buyer, as long as the respective hierarchical branches being connected are ready and compatible for the connection.

In this last respect, an efficient sub-bidder may be able to re-use estimates/quotes with a number of upper-level bidders, even if the original top-level bidder delays or even does not submit their top-level bid. In fact, by enabling the establishment of connections between unsubmitted top-level bids, the connections may even be bidirectional, by re-using different parts of the estimate hierarchy from the first and second top-level bids, as illustrated in FIG. 15.

Small differences in quantities in quotes may be tolerated by the system as acceptable, as the main aspect is the unit price, not the total price. The system may allow or disallow these differences in quotes up to a predefined amount; this possibility will usually be set by the buyer as a preference for each bidding process.

Small differences in product type in quotes may be tolerated by the system as acceptable, but these may create bids that are more difficult to merge, as they do not follow the original segmentation and may even create a non-conformity with the original buyers requirements. The system may allow or disallow these differences in quotes up to a predefined level; this possibility will usually be set by the buyer as a preference for each bidding process.

Evaluation Process

The bidding process will normally include "normal" response bids and rides (i.e. bids generated according to an embodiment of the present system), which may be analyzed together. This may be using a single-criteria analysis such as price and at the same time filtering for quality, delivery time. This may also be analyzed using any possible multi-criteria tools. This evaluation is multi-level as any level player will conduct their own evaluation of proposals (FIG. 14).

This will usually involve setting margin and price offset modifiers such that a bidder company may then compose their own bid by aggregating and adjusting the prices from the bids they have received.

Multiple RFQs

In particular settings, any specific level bidder may launch a number of RFQs for the same purchase—for example, if the first RFQ did not succeeded in obtaining a sufficient number of replies, or maybe the bidder is launching a RFQ for a first target country and a second RFQ for a second target country—with the embodiments of the present system ensuring all replies being simultaneously available for comparison and analysis. In the case of multiple RFQs, any specific level bidder may use a RFQ Reply, for example because it is particularly well constructed or structured, as a template for generating new RFQs.

"Copy/Paste"—Upper-Level Bidder Direct Use of Existing Lower-Level Bids

Another possibility is that upper level bidders may directly access and use already existing directly lower-level bids even before issuing their own RFQ. As the hierarchical RFQ Ride database 40 can be freely looked up by those upper-level bidders, they may well choose to speed up the bidding process by using directly ("copy/paste") a previously existing RFQ Response, dispensing with the RFQ steps (i.e. choosing the successful bidder directly from the Ride database 40). Alternatively, the upper-level bidders may simply use an existing RFQ Response, for example because it is particularly well constructed or structured, as a template for generating the RFQ.

These "copy/paste" RFQ Ride Connections 42 may happen from any hierarchical level to any hierarchical level.

These "copy/paste" RFQ Ride Connections 42 may be fully automatic or partially or fully 'manual', where price estimates/quotes may be automatically forwarded or may imply a degree of human intervention—see previously 'automatic' vs 'private'.

BRIEF DESCRIPTION OF THE DRAWINGS

The following figures provide preferred embodiments for illustrating the description and should not be seen as limiting the scope of disclosure.

Figure 1:
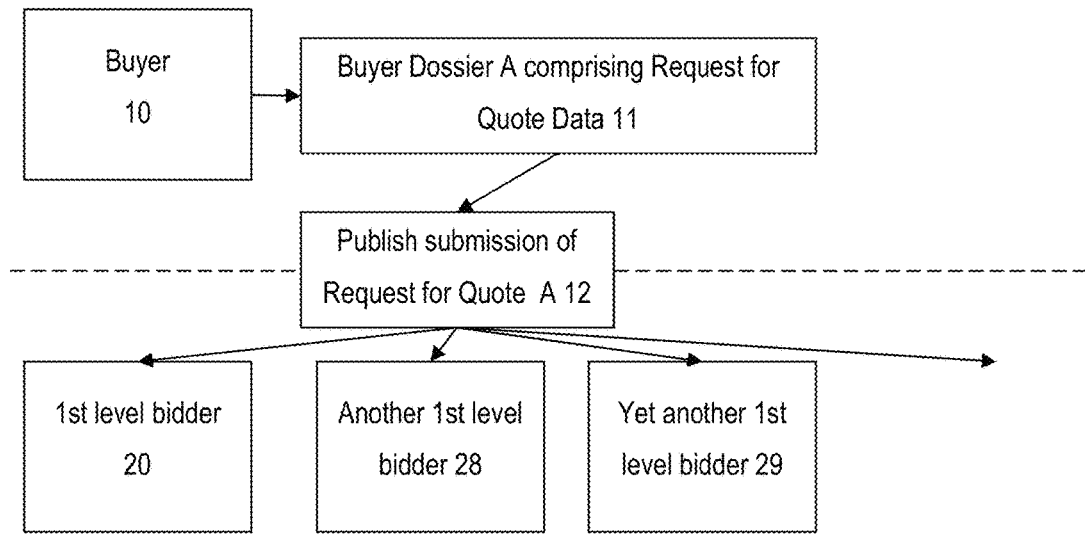
FIG. 1 describes a typical purchasing process where a buyer 10 prepares an opportunity, here designated buyer dossier 11, and issues a Request for Quote A (RFQA) 12 based on the buyer dossier A 11.
Figure 2:
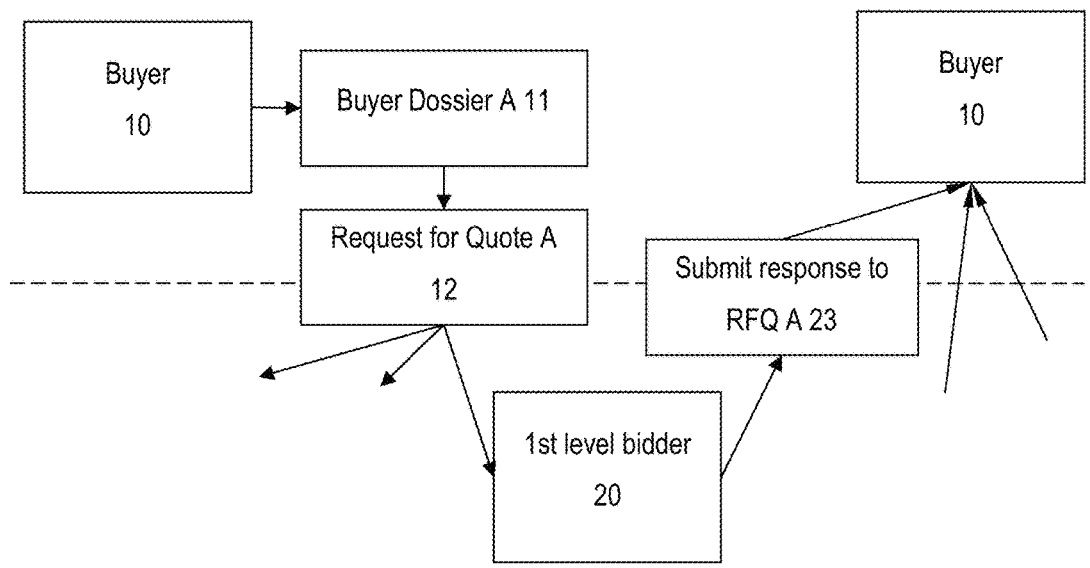
FIG. 2 describes a typical purchasing process where one of the $1^{st}$ level bidders 20 has chosen to reply, with a quote/estimate, by a Response to the RFQA 23, to the buyer 10.
Figure 3:
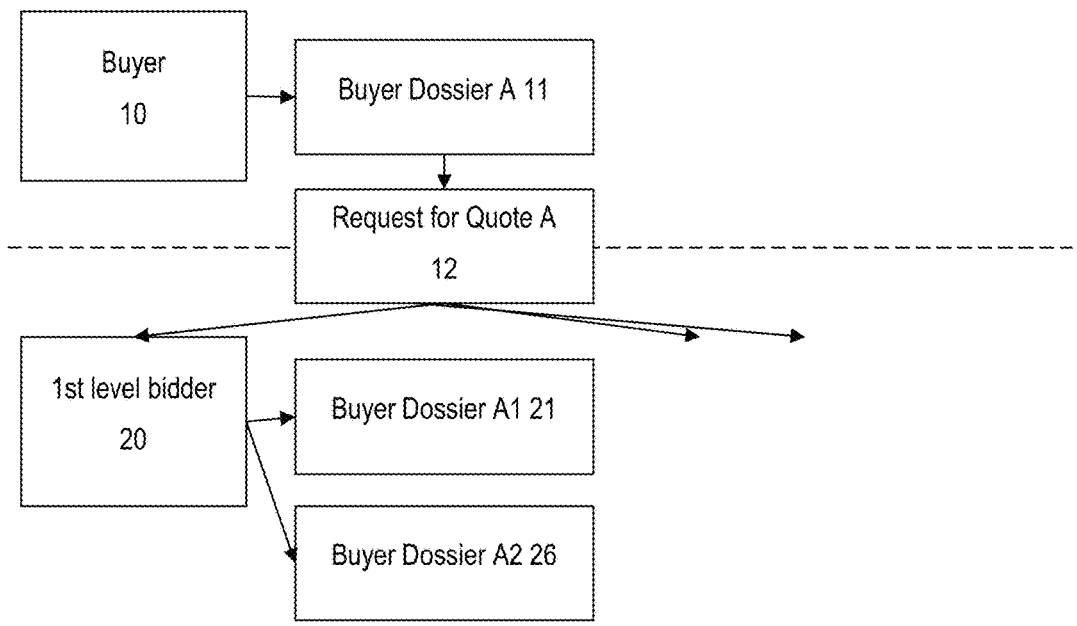
FIG. 3 describes a typical purchasing process where a $1^{st}$ level bidder 20 chooses to delegate/subcontract two parts of the original Buyer Dossier A 11 by creating two sub-dossiers, Buyer Dossier A1 21 and Buyer Dossier A1 26.
Figure 4:
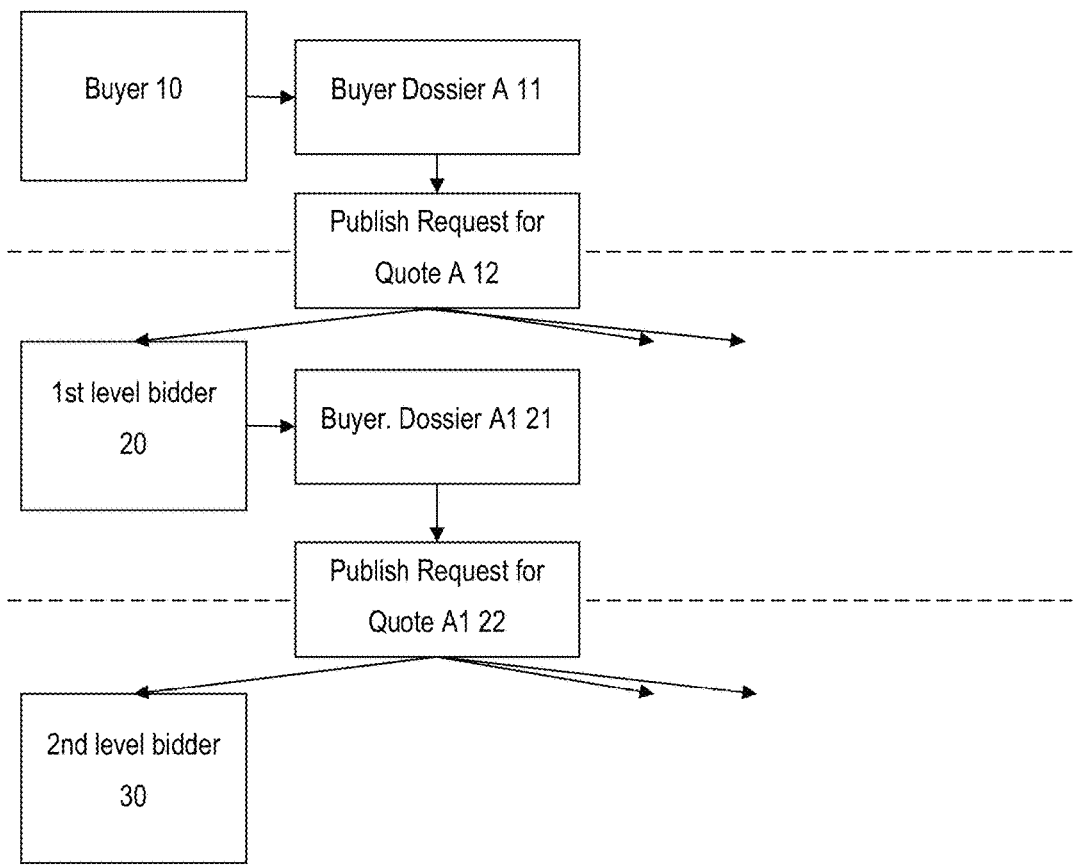
FIG. 4 describes a typical multi-level purchasing process where a $1^{st}$ level bidder 20 issues a Request for Quote A1 21 based on a Buyer Dossier A1 21 to a $2^{nd}$ level bidder 30.
Figure 5:
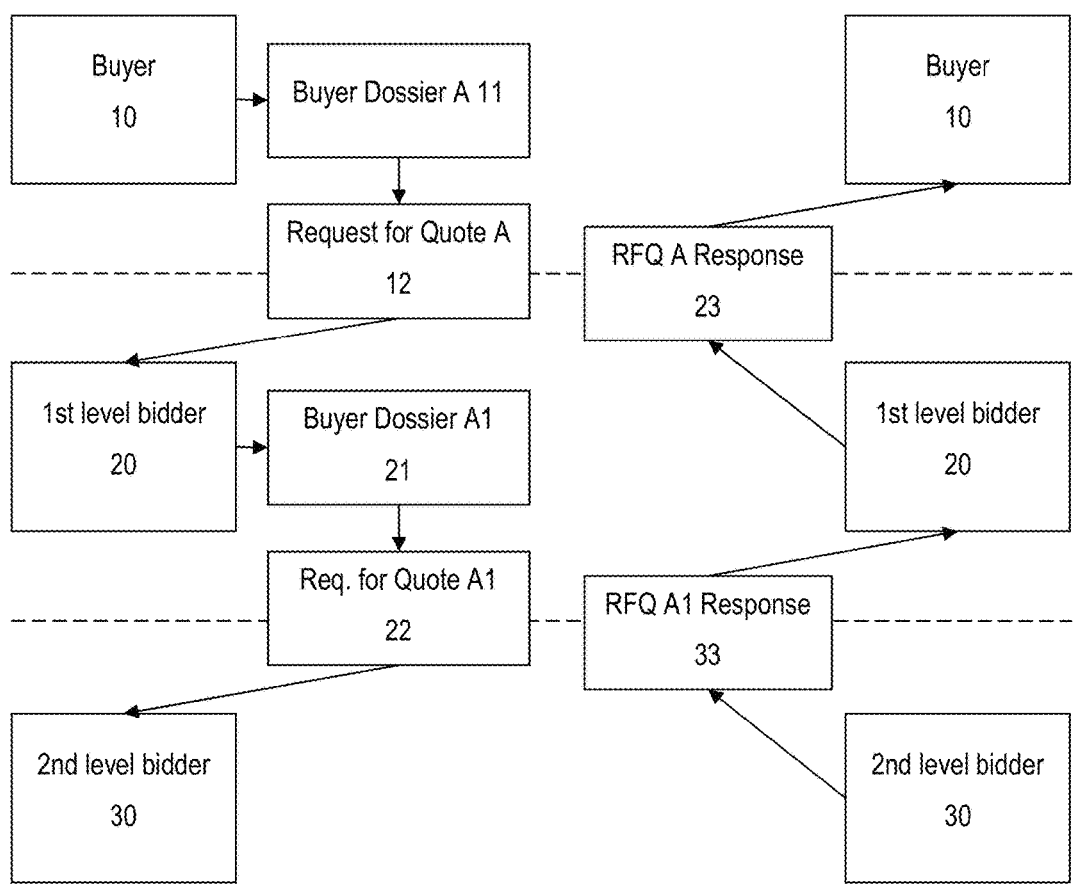
FIG. 5 describes a typical purchasing process where the bidders, reversing the RFQ order, now respond by issuing quotes/estimates to the upper levels.
Figure 6:
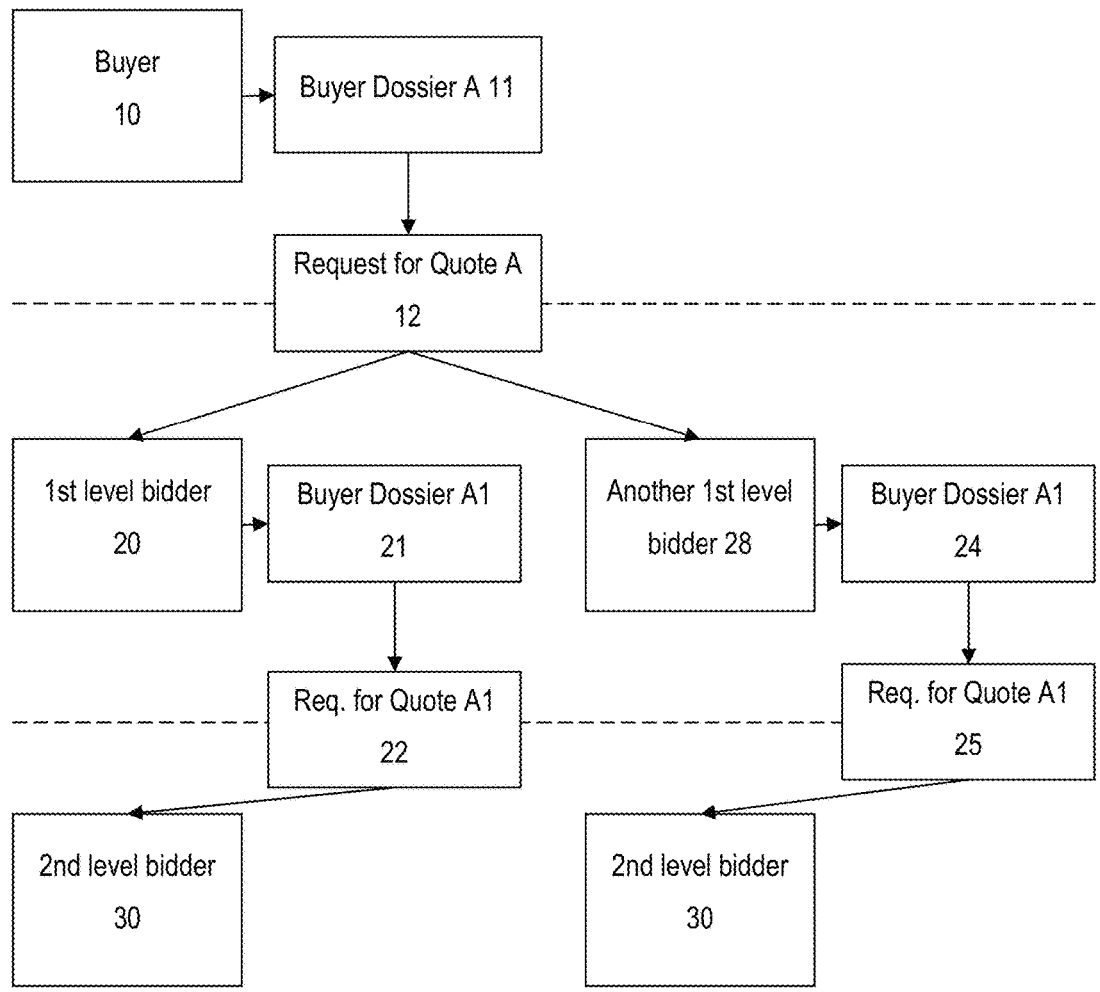
FIG. 6 describes a typical purchasing process where the same $2^{nd}$ level bidder 30 receives two Requests for Quote A1 22, 25 from two different first level bidders 20, 28 concerning the same purchasing process initiated by the same buyer 10.
Figure 7:
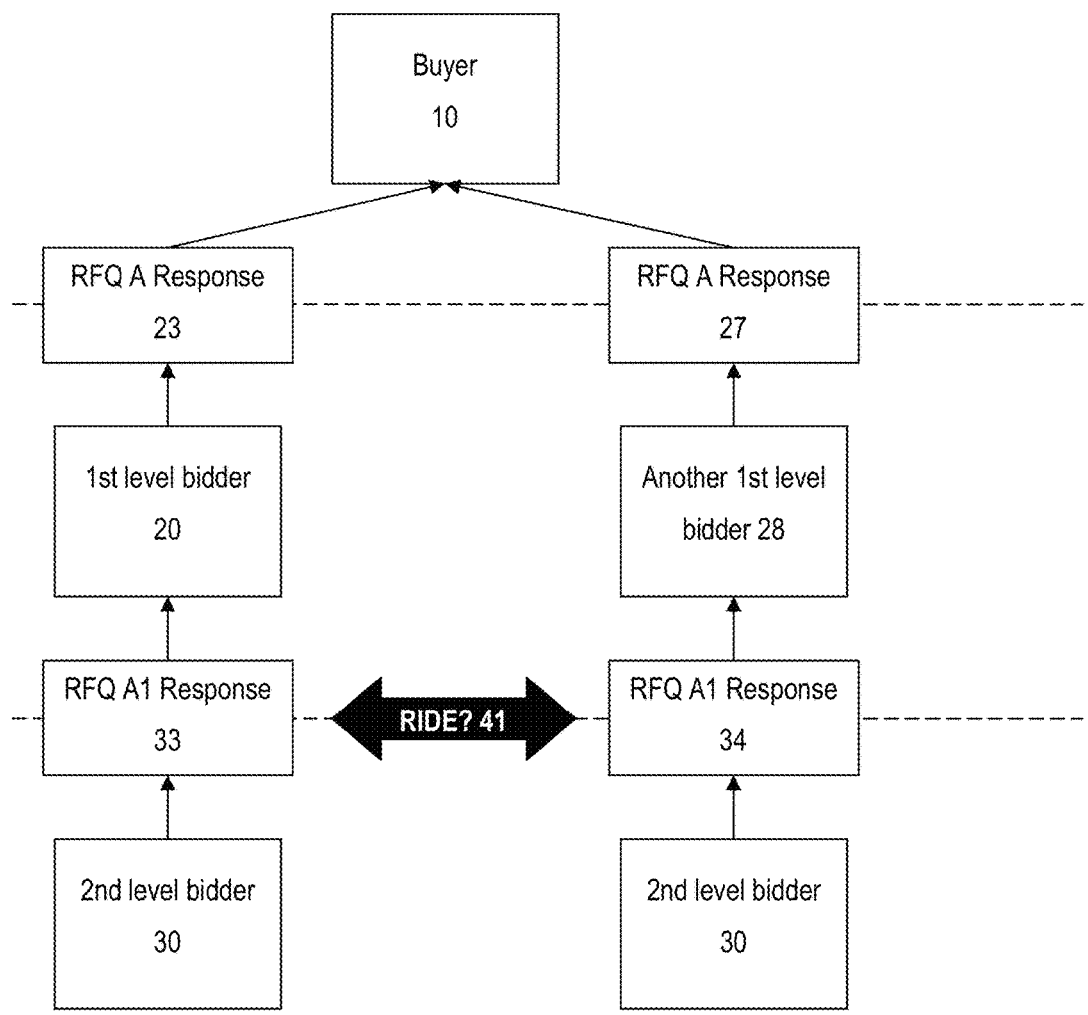
FIG. 7 describes the follow-up to the typical purchasing process in FIG. 6 where the $2^{nd}$-level bidder responds to the two Request for Quotes A1 33, 34 by sending two responses with quote/estimates to A1 33, 34. A potential data connection hereby referred as a Potential Ride 41, could be established.
Figure 8:
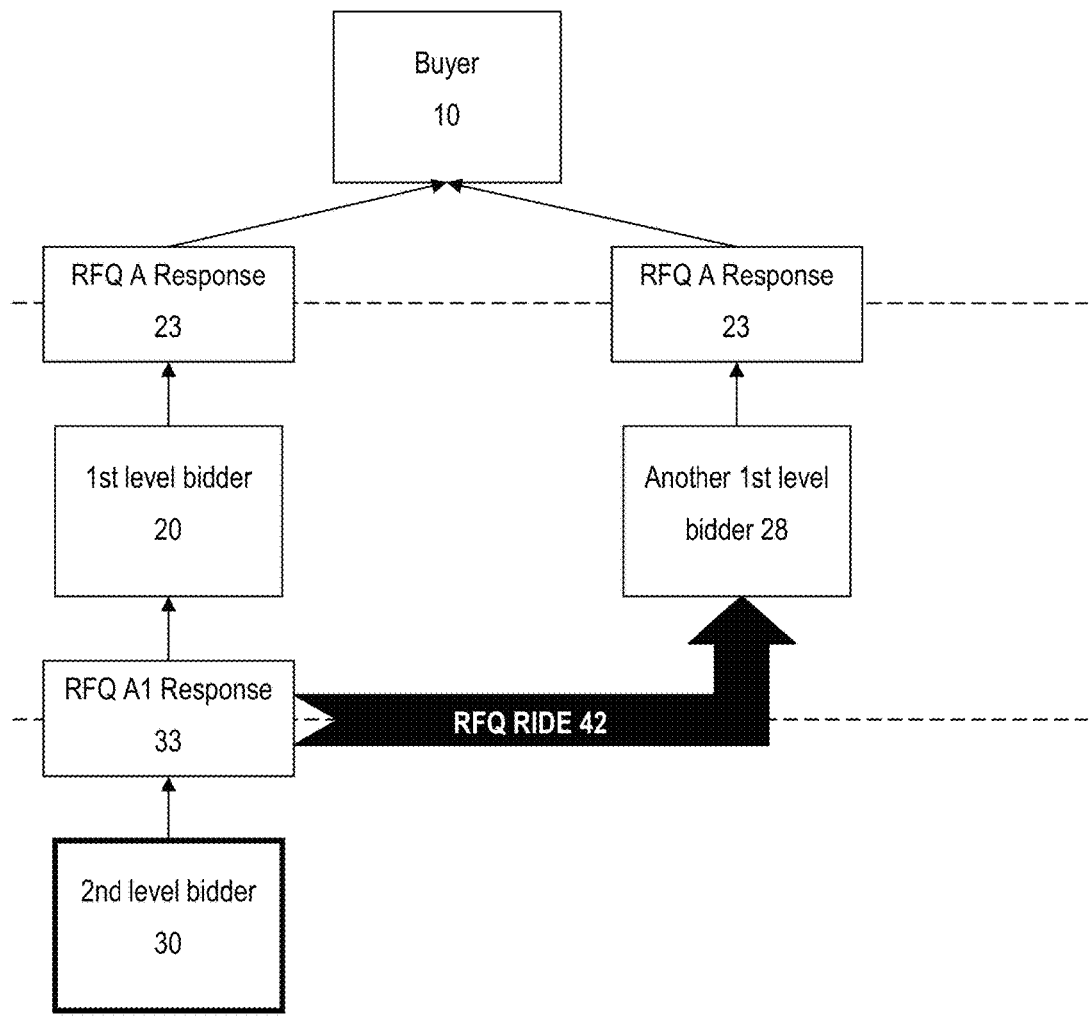
FIG. 8 shows how such connection could be established, when the $2^{nd}$ level bidder recognizing the duplication simply re-issues the previous RFQA1 response 33 to the other $1^{st}$ level bidder 28, establishing a data connection hereby referred a Request for Quote Ride 42.
Figure 9:
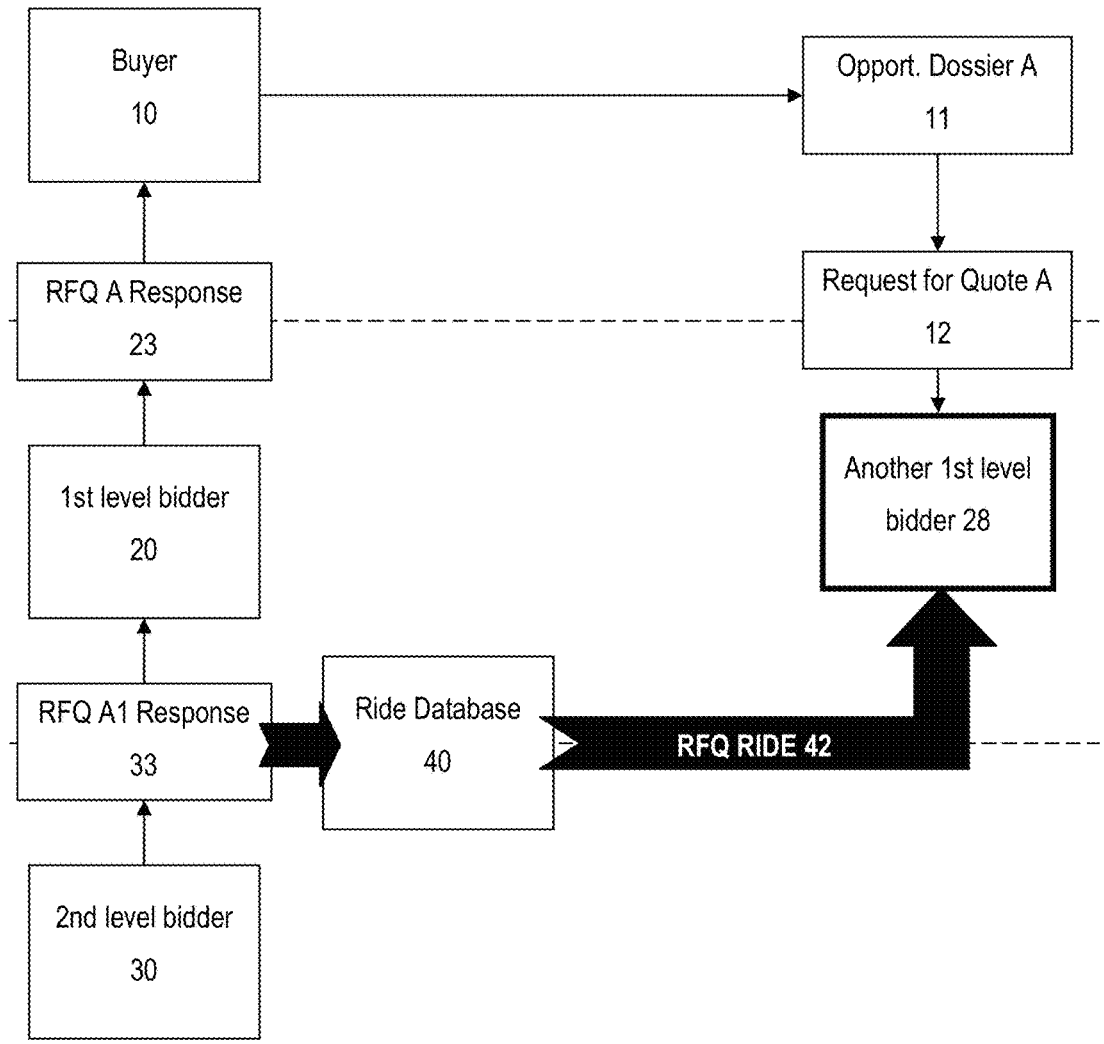
FIG. 9 shows how such connection could be established in an improved way, which is part of the present disclosure. The $2^{nd}$ level bidders are able, when responding to a RFQ, to issue the same response, a RFQ Ride 42, to a database, hereby referred as Ride Database 40.
Figure 10:
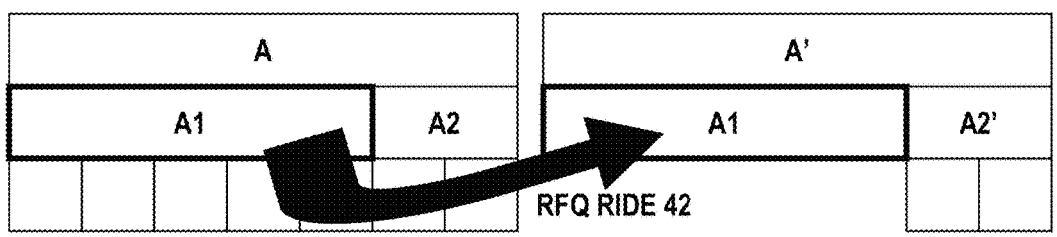
FIG. 10 describes a simplified Buyer Dossier A, namely in its hierarchical structure for illustrative purposes. In this case, purchase items A were split into two sub-bids A1 and A2 which were then subsequently taken by a number of sub-sub-bidders. A second top-level bidder for the same purchasing process, bidding for the same items A as in A', was able to re-use the previously available estimate/quote A1 by establishing the RFQ Ride 42 connection.
Figure 11:
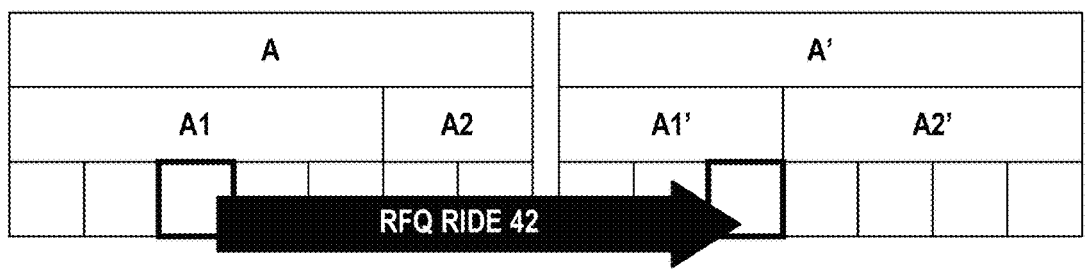
FIG. 11 shows a similar connection but occurring at a lower-level in the hierarchy.
Figure 12:
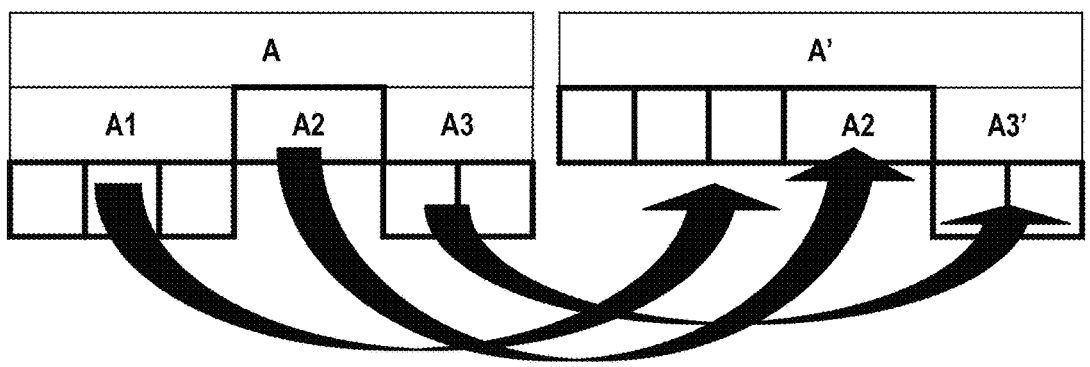
FIG. 12 shows a much more typical situation, where the RFQ Ride 42 connections are multiple and occur at multiple hierarchical levels.
Figure 13:
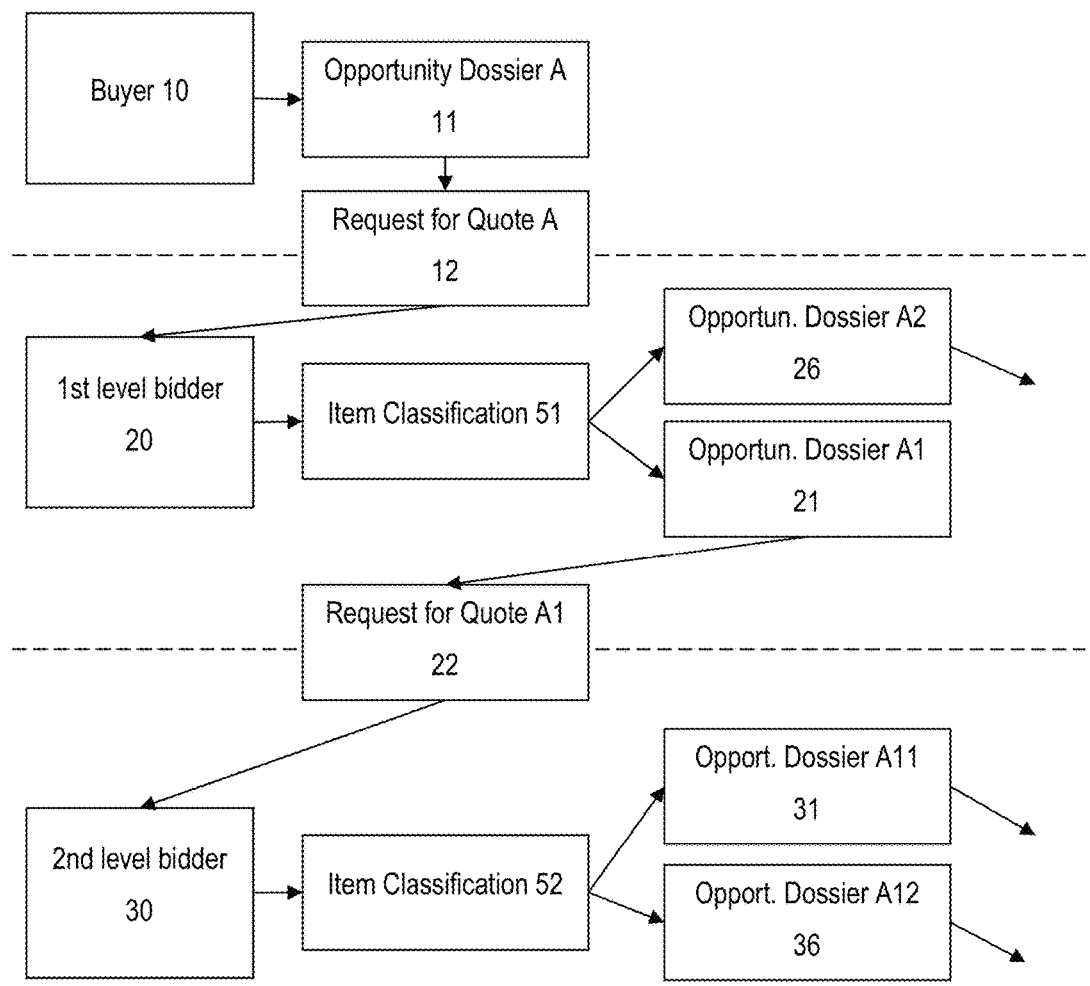
FIG. 13 shows a purchasing process of the system according to the disclosure whereby it is shown how the item classification procedure 51, 52 at each bidding level of the process, automatically creates the above described multiple hierarchical buyer dossiers which then enable the re-use of estimates/quotes.
Figure 14:
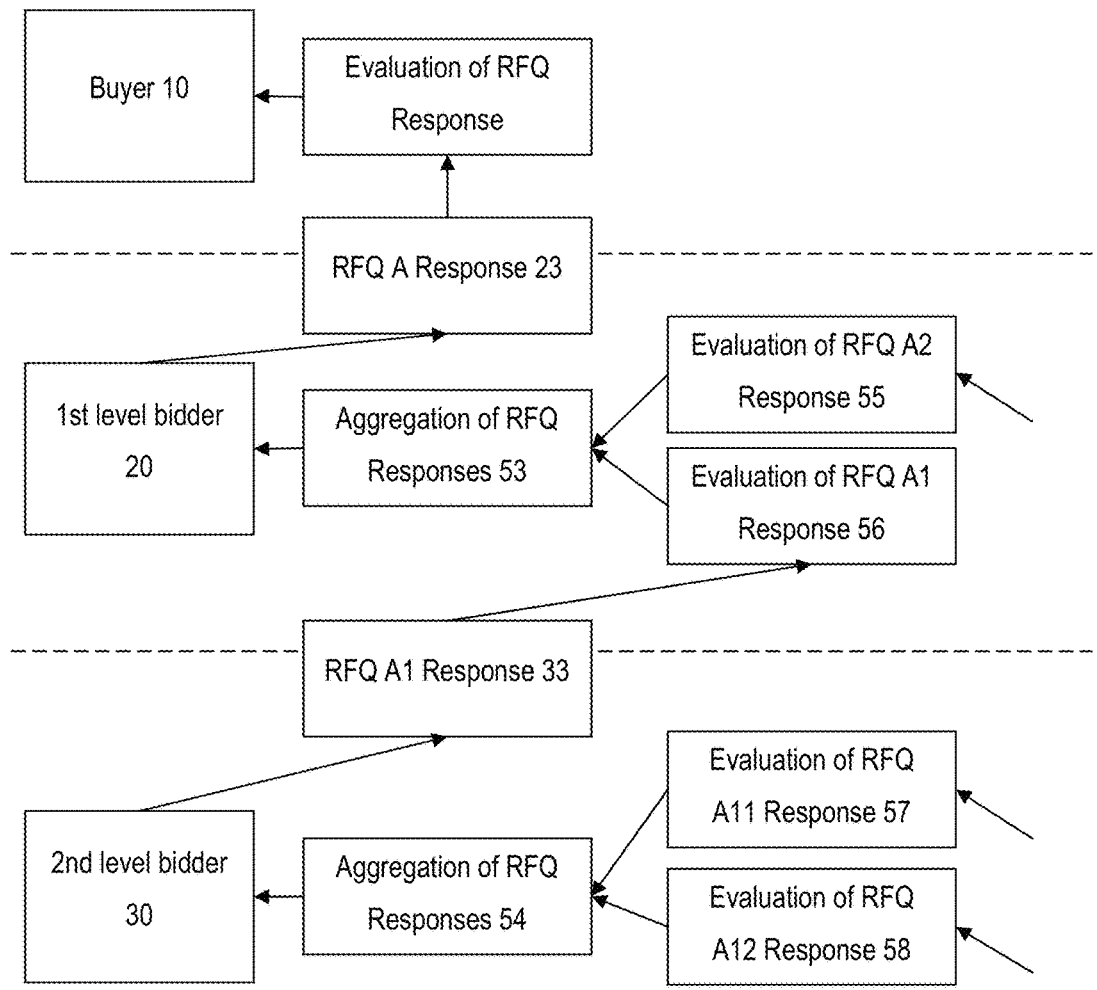
FIG. 14 shows the analysis os RFQ Responses using multi-level evaluation, with all level entities conducting their own evaluation of received proposals.
Figure 15:
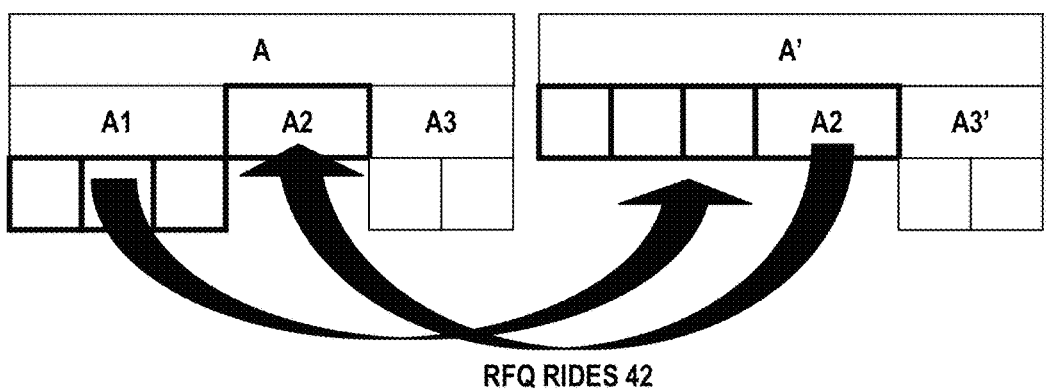
FIG. 15 shows how by enabling the establishment of connections between unsubmitted top-level bids, the connections may even be bidirectional, re-using different parts of the estimate hierarchy from a first and second top-level bids.

In the figures, the various elements are such that:
- (10) represents a top-level buyer,
- (11) represents an buyer dossier A by the top-level buyer 10,
- (12) represents request for quote (RFQ) for the buyer dossier A 11 by the top-level buyer 10,
- (20) represents a 1st level bidder,
- (21) represents an buyer dossier A1 by the 1st level bidder 20,
- (22) represents a request for quote (RFQ) for dossier A1 21 by the 1st level bidder 20,
- (23) represents a response to the request for quote (RFQ) 12 of the top-level buyer 10 by the 1st level bidder 20,
- (26) represents another buyer dossier A2 by the 1st level bidder 20,
- (28) represents another 1st level bidder,
- (24) represents an buyer dossier A1 by another 1st level bidder 28,
- (25) represents a request for quote (RFQ) for dossier A1 24 by another 1st level bidder 28,
- (27) represents a response to the request for quote (RFQ) 12 of the top-level buyer 10 by another 1st level bidder 28,
- (29) represents yet another 1st level bidder,
- (30) represents a 2nd level bidder,
- (31) represents an buyer dossier A11 by the 2nd level bidder 30,
- (33) represents a response to the request for quote (RFQ) 22 of the 1st level bidder 20 by the 2nd level bidder 30,
- (34) represents a duplicate response to the request for quote (RFQ) 25 of the another 1st level bidder 28 by the 2nd level bidder 30,
- (36) represents another buyer dossier A12 by the 2nd level bidder 30,
- (40) represents a RFQ ride database,
- (41) represents an unused RFQ ride possibility by the 2nd level bidder 30,
- (42) represents an effective RFQ ride by the 2nd level bidder 30, making use of the response 33 to the request for quote (RFQ) 22 of the 1st level bidder 20, by using it also as a response to the request for quote (RFQ) 25 of the another 1st level bidder 28,
- (51) represents an item classification of Request for Quote A 12 by the 1st level bidder 20 into buyer dossier A1 21 and buyer dossier A2 26,
- (52) represents an item classification of Request for Quote A1 22 by the 2nd level bidder 30 into buyer dossier A11 31 and buyer dossier A12 36
- (53) represents an RFQ Response aggregation by the 1st level bidder 20 into RFQ A Response 23 of RFQ A1 Response 33 and RFQ A2 Response,
- (54) represents an RFQ Response aggregation by the 2nd level bidder 30 into RFQ A1 Response 33 of RFQ A11 Response and RFQ A12 Response,
- (55) represents the evaluation of RFQ A2 Response,
- (56) represents the evaluation of RFQ A1 Response 33,

(57) represents the evaluation of RFQ A11 Response,
(58) represents the evaluation of RFQ A12 Response.

MODES FOR CARRYING OUT THE DISCLOSURE

Figure 16A:
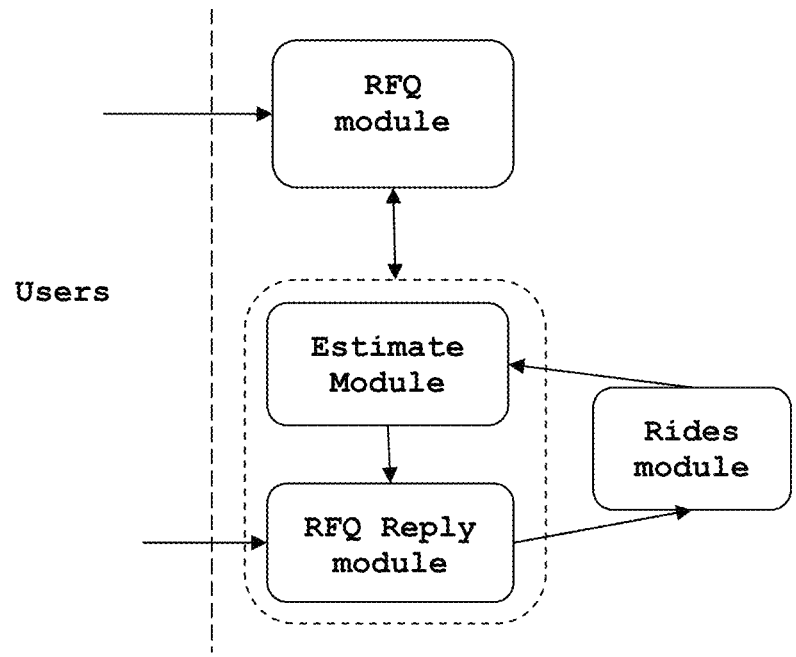
FIG. 16 shows two embodiments, both comprising a RFQ Module, a Reply Module comprising both an Estimate Module and a RFQ Reply Module, and a Rides Module. The second embodiment comprises a direct "copy/paste" connection from the Rides Module back to the RFQ module.
Figure 16B:
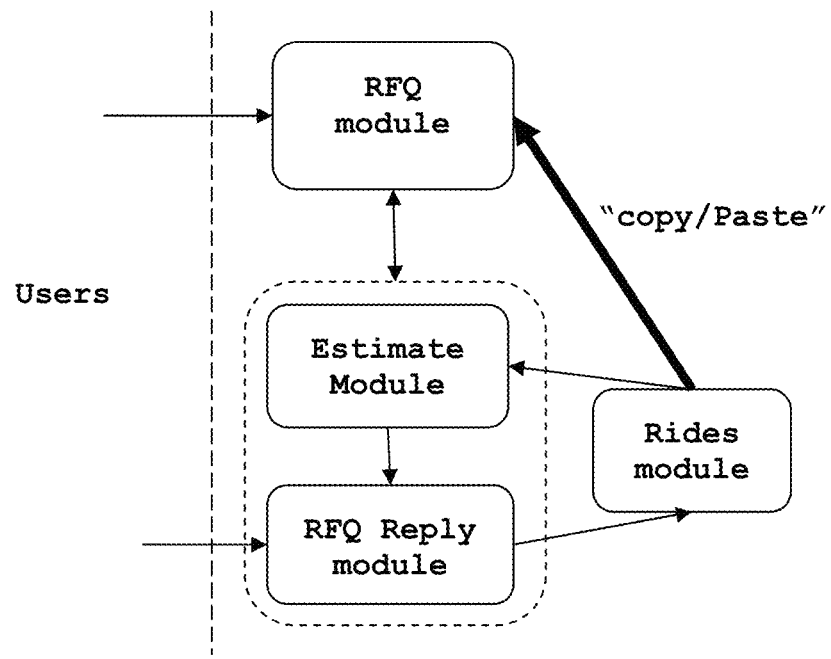

FIG. 16 shows two embodiments (a/b), both comprising a RFQ Module, a Reply Module comprising both an Estimate Module and a RFQ Reply Module, and a Rides Module. In the second embodiment, FIG. 16b, a direct connection exists back to the RFQ module so that the "copy/paste" mechanism can operate by initiative of upper-level bidders.

Figure 17:
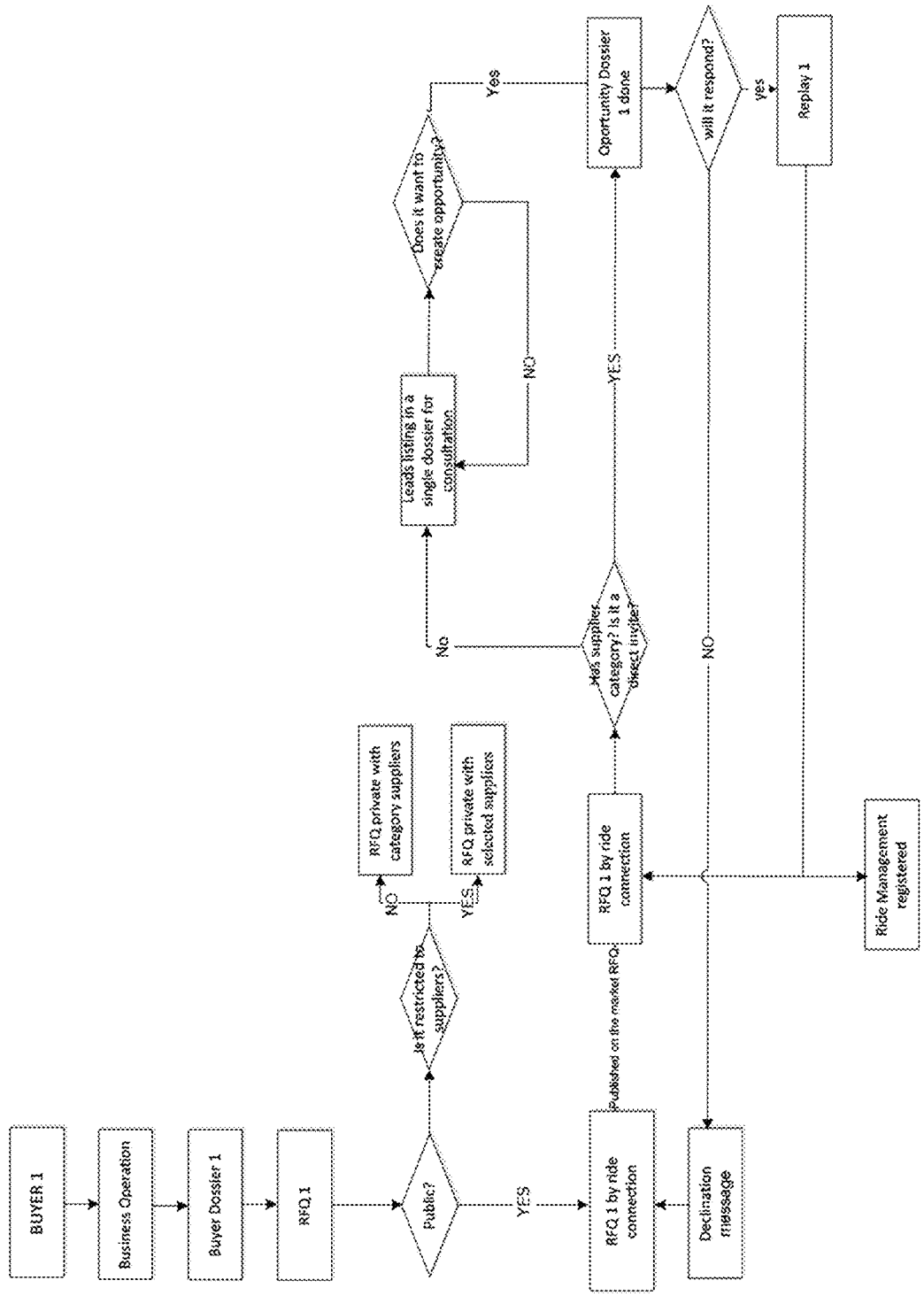
FIG. 17 shows an embodiment with a bidding process, after completion of RFQ (RFQ1), discloses how to provide the possibility to re-use the estimates given in response to the RFQ.

FIG. 17 shows an embodiment with a bidding process, from completion of a request for quote RFQ (RFQ1) to the RFQ reception by the bidders (REPLAY 1), discloses how to provide the possibility to re-use the estimates given in response to the RFQ (RQ1 with ride diffusion), in this case namely the first re-use of the estimate.

Figure 18:
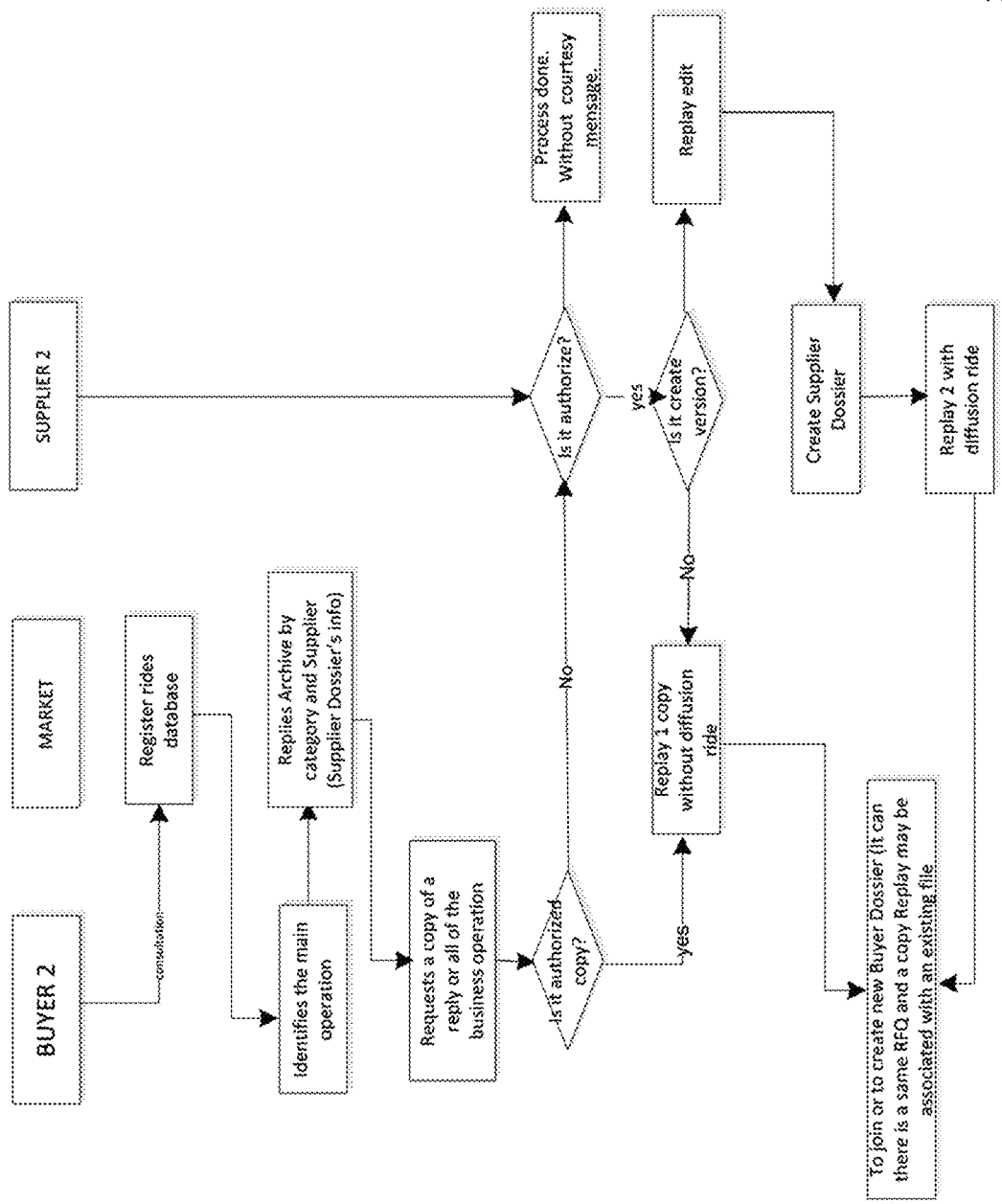
FIG. 18 shows an embodiment with a process for re-use of a previously existing estimate, wherein the buyer can simply take the previously existing estimate and dispense with a bidding process.

FIG. 18 shows an embodiment with a process for re-use of a previously existing estimate, in particular wherein the buyer can simply take the previously existing estimate and dispense with a bidding process. This figure shows the flow of steps needed from the buyer when a ride is required. The buyer looks up in the ride database (or repository) for an adequate estimate. The buyer may use immediately an existing ride (in the case of automatic rides) or may request a ride (in the case of 'manual' rides, as opposed to automatic rides but still implemented by the system, authorization by the bidder is required case-by-case). In the case of 'manual' rides, the system allows the bidder may modify the estimate before submitting the estimate or may simply keep the previous estimate unchanged. If the estimate is changed, the system allows the bidder to make available the modified estimate as a new ride in the rides database.

Figure 19:
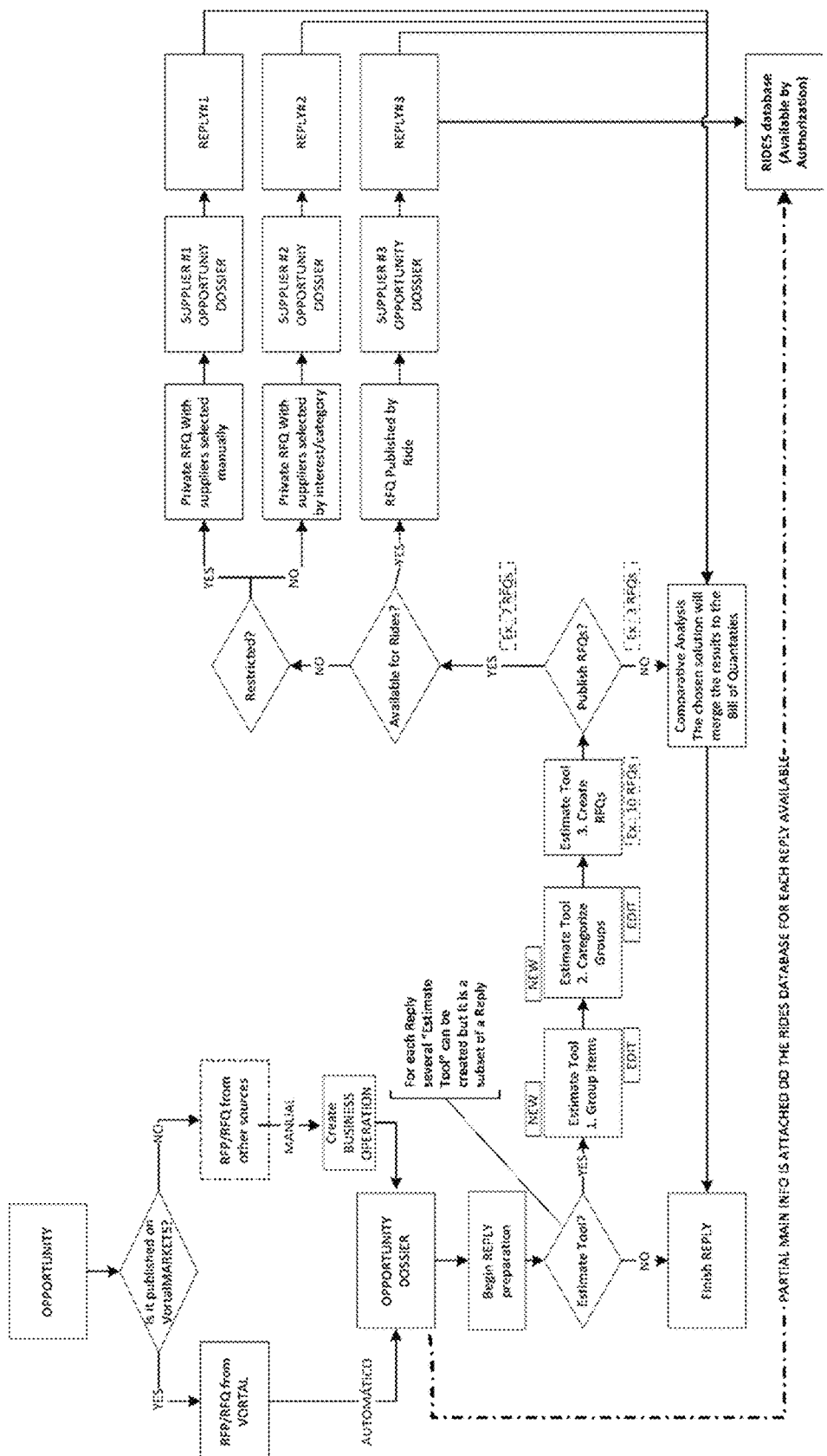
FIG. 19 shows an embodiment comprising a process for segmenting (groups/categories) and publishing the RFQ estimate responses for posterior availability.

FIG. 19 shows an embodiment comprising a process for segmenting (groups/categories) and publishing the RFQ estimate responses for posterior availability. The process starts with an opportunity recorded as a request for quote RFQ or request for proposal RFP. This can be internal to the system (designated as "Vortal" in this embodiment) or external to the system (from other sources, in particular initiated by the bidders). Previously, a bidding/purchasing process always required a fully structured RFQ/RFP before initiating the process, whereas in the embodiments of the present disclosure, the process is signaled for initiation by publishing an opportunity, deferring the RFQ/RFP completion, thus permitting RFP completion by the bidders.

The segmentation of the RFQ is also shown as these are separately and subsequently placed for bidding thourg further RFQ's (private or published RFQ's). In some embodiments, these can then be privately communicated to a selection of suppliers, privately communicated to a category or interest group of suppliers, or made fully public and open to all.

The aggregation of the estimates received from the sub-bidders (Reply 1-3) is also shown into a unified RFQ. These can then made available individually, with the communication and authorization options described above, in the rides database.

Figure 20:
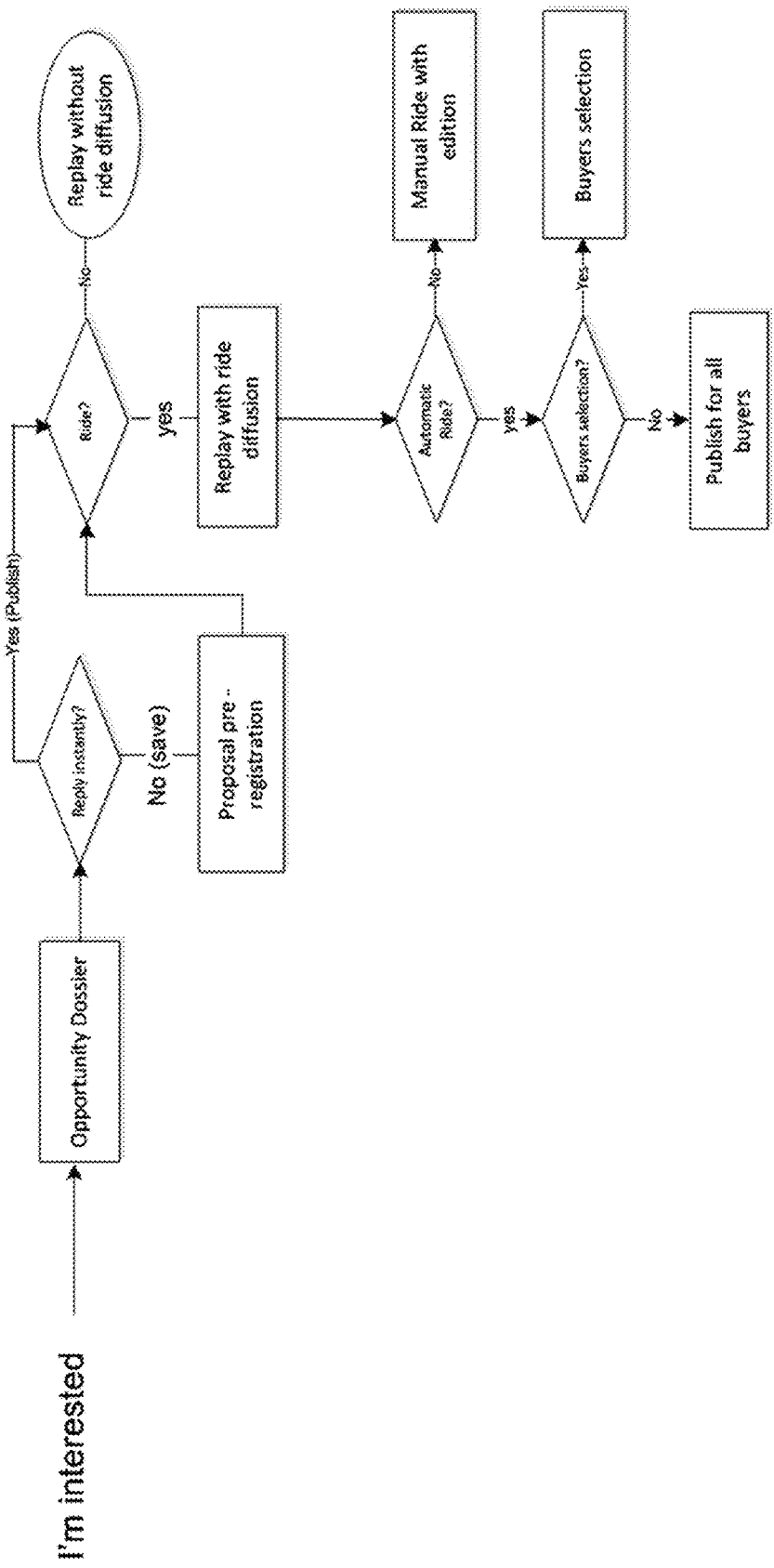
FIG. 20 shows an embodiment comprising a process for publishing the RFQ estimate responses, according to availability criteria (automatic vs. 'manual'; selection vs. all) towards new buyers of the preexisting the RFQ estimate responses.

FIG. 20 shows an embodiment comprising a process of the supplier for publishing the RFQ estimate responses, according to availability criteria (automatic vs. 'manual'; sub-selection vs. all) towards new buyers of the preexisting the RFQ estimate responses. As before, the buyer may use immediately an existing ride (in the case of automatic rides) or may request a ride (in the case of 'manual' rides). As before 'manual' rides are denoted as opposed to automatic rides, but these are also implemented by the system, it is that the authorization by the bidder is required case-by-case and not pre-authorized, thus requiring one additional step of explicit case-by-case authorization by the bidder. As before, the RFQ's can then be privately communicated to a sub-selection of suppliers, privately communicated to a category or interest group of suppliers, or made fully public and open to all.

Figure 21:
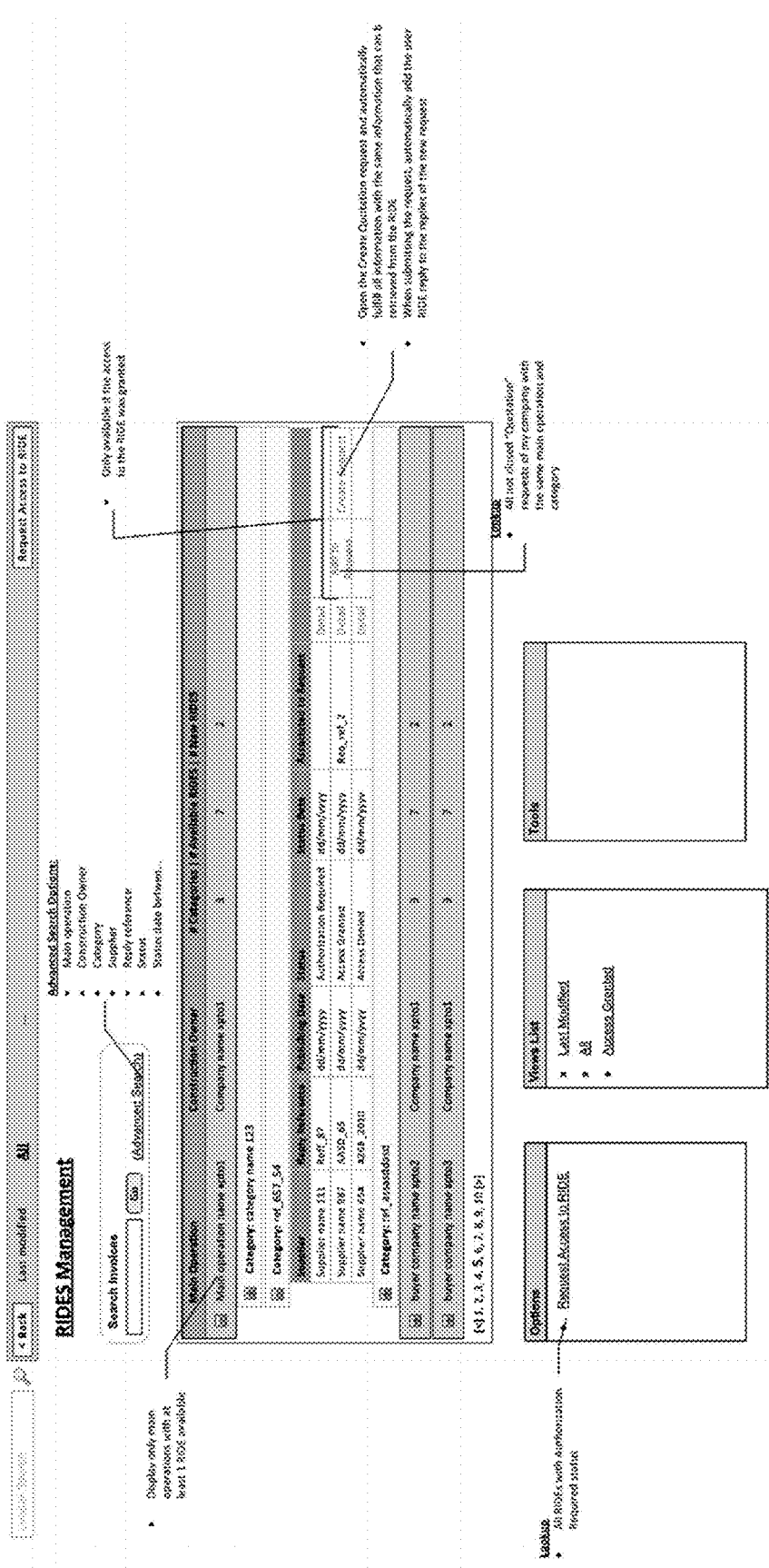
FIG. 21 shows an embodiment comprising a computer interface screen for managing the re-use of preexisting RFQ estimate responses, wherein the user can lookup, see and create new RFQ's based on the existing estimate structure, request access to 'manually'-available preexisting RFQ estimate responses, copy preexisting RFQ estimate responses to fulfill parts (or the whole) the bidding process.

FIG. 21 shows an embodiment comprising a computer interface screen for managing the re-use of preexisting RFQ estimate responses, wherein the user can lookup, see and create new RFQ's based on the existing estimate structure, request access to 'manually'-available preexisting RFQ estimate responses, copy preexisting RFQ estimate responses to fulfill parts (or the whole) the bidding process.

Figure 22:
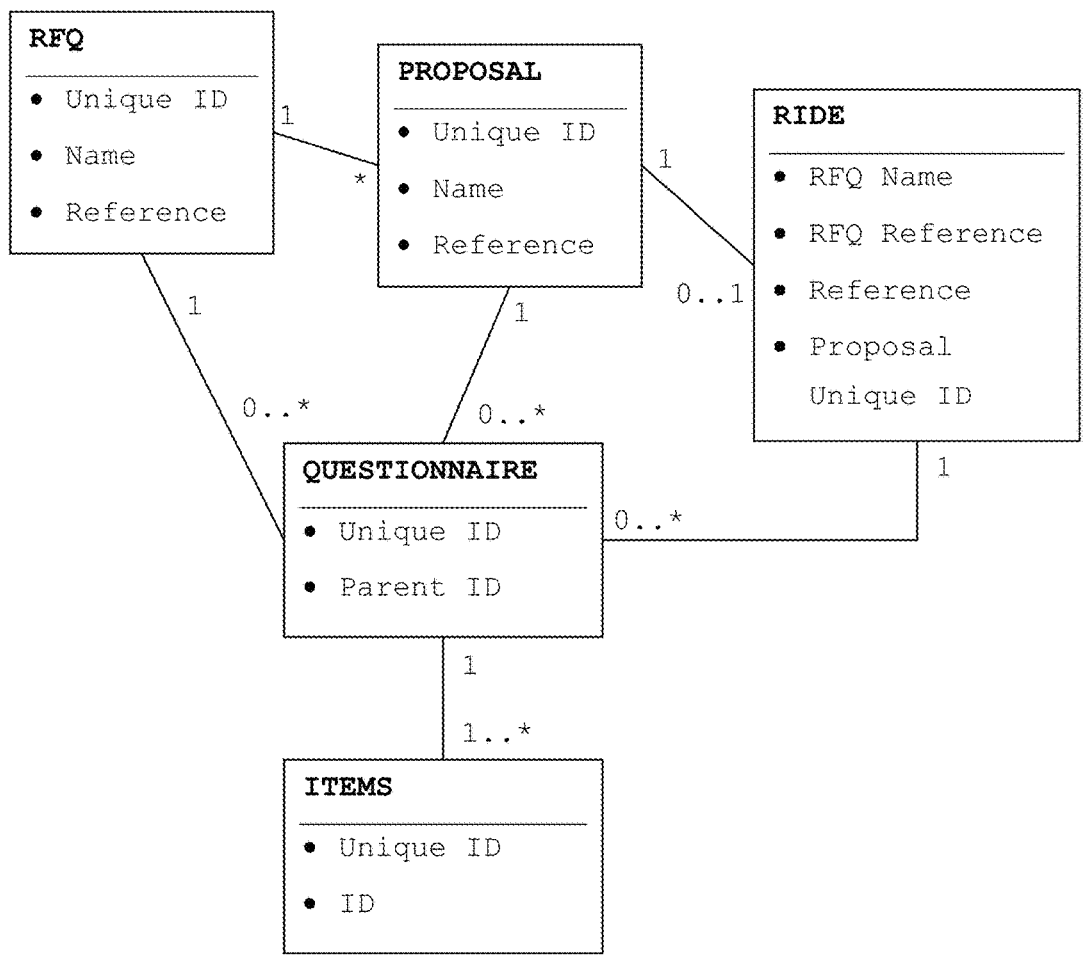
FIG. 22 shows an embodiment program and data structure.

FIG. 22 shows an embodiment program and data structure (e.g. class diagram) comprising a request for quote (RFQ), associated with multiple questionnaires (i.e. constituting the bill of materials, i.e. items, for quotation), each questionnaire associated with multiple items for quotation, also comprising multiple proposals associated with each RFQ, each proposal also associated with multiple questionnaires (i.e. the bill of materials, i.e. items, being proposed), and a ride optionally associated with each proposal also associated with multiple questionnaires (i.e. the bill of materials, i.e. items, being made available for re-use/ride).

Figure 23:
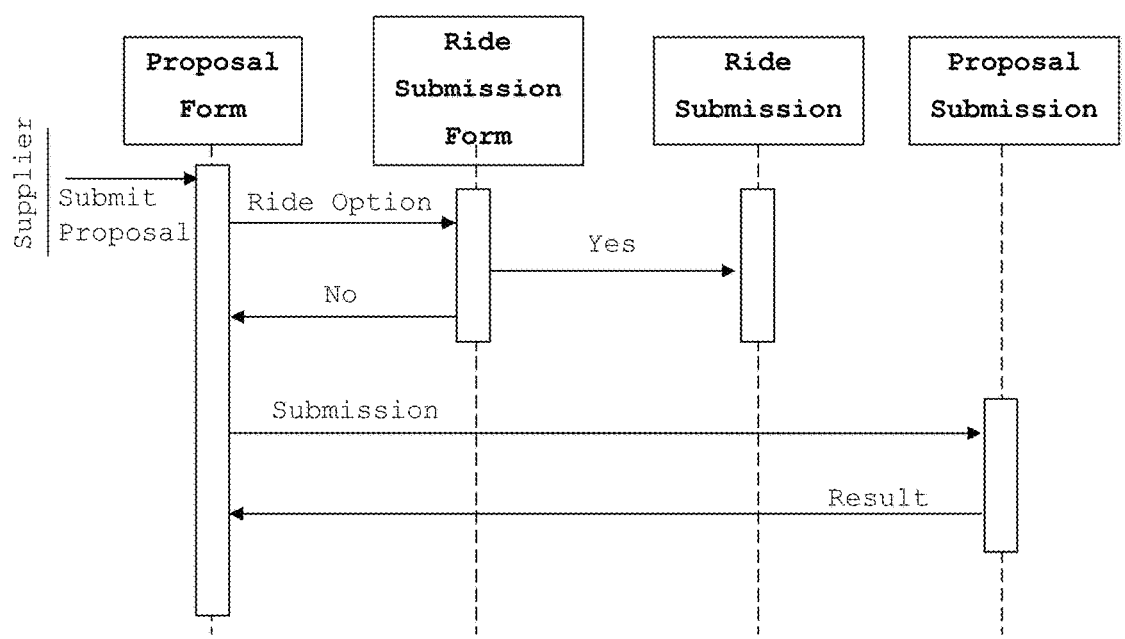
FIG. 23 shows an embodiment sequence diagram.

FIG. 23 shows an embodiment sequence diagram, wherein a Supplier on submitting a proposal (i.e. response) is given the option of allowing ride (i.e. re-use) status on the proposal. If not allowed, control returns to the proposal form. If the ride/re-use of the proposal is selected, then the ride/re-use is submitted, for example in one of the ways described. The proposal is submitted, with or without Ride status available, depending on the Supplier option.

The terms request-for-proposal and request-for-quote are used interchangeably in the disclosure.

The above modules and methods can of course be implemented via software, firmware, and/or hardware, such as a processor and/or processor means, which can include one or more microprocessors, integrated circuits, FPGA's, optical processor's, etc. . . . . Typically an application server coupled in a web server architecture may be used, preferably in a client-server configuration. The application may be distributed, or simply reside in one or more central servers. A database/application/server stack may be used such as a relational database, such as a SQL Server. Typically, the application layer may be assured by a WASserver, e.g. using Java EE for processing XML data structures. The interfaces may use web service protocols such as SOAP. Middleware such as those based on messaging can be used, such as XMPP or simply based over JMS. A typical embodiment comprises a Weblogic 11g application server or a JBoss application server or a Swim Lane application server.

The provision of one or more of the mentioned database storage or lists can be advantageously provided by cursor or indexer data structures.

The provision of one or more of the mentioned data access or transmission steps can be advantageously provided by further cursor or indexer data structures.

The provision of one or more of the mentioned data transformation steps can be advantageously provided by procedural or transactional request messages. Optionally, these procedural or transactional request messages may incorporate the decision steps conditional to the execution of said adjustment steps.

The provision of one or more of the mentioned data transformation steps can be advantageously provided by indexed data structures or by signalizing messages.

The invention is of course not in any way restricted to the embodiments described and a person with ordinary skill in the art will foresee many possibilities to modifications thereof without departing from the disclosure as defined in the appended claims.

The invention claimed is:

1. A method performed by a computer configured by the execution of instructions in one or more programs stored in a non-transitory storage medium for hierarchical multi-level segmentation and estimate reuse request for a bidding system, the method comprising:
    performing by the computer a process for controlling access to data in the bidding system when: (i) a buyer request for quote A that is associated with buyer dossier A items being put up for quotation is received, (ii) a first bid, from a first bidder on a first-level, for quote A1 that includes a quote associated with bidder dossier A1 items which are a subset of the buyer dossier A is received, (iii) a second request, from a second bidder on the first-level, for quote A2 that includes a quote associated with bidder dossier A2 items which are another subset of the buyer dossier A items is received and (iv) a bidder response from a third bidder on a second-level which is a response to the request for quote A1 is received, and controlling access by the second bidder to the bidder response sent to the first bidder, the process including
    determining, by the second bidder referencing a database to which the bidder response from the third bidder on the second-level is sent, whether the bidder dossier A2 items are duplicative of the bidder dossier A1 items,
    automatically or manually transmitting, to the second bidder, a copy of the bidder response sent to the first bidder in a case that the bidder dossier A2 items are duplicative of the bidder dossier A1 items, in response to a request of the second bidder to have access to the copy of the bidder response sent to the first bidder,
    determining whether specific conditions imposed by the third bidder on the second-level are met,
    preventing, in the automatic transmission, the access by the second bidder on the first-level to the copy of the bidder response sent to the first bidder on the first-level when it is determined that the specific conditions imposed by the third bidder on the second-level are not met, and
    preventing, in the manual transmission, the access by the second bidder on the first-level to the copy of the bidder response sent to the first bidder on the first-level, when the third bidder on the second-level determines, upon review of the request for access from the second bidder on the first-level, to block the access by the second bidder on the first-level to the copy of the bidder response sent to the first bidder on the first-level.

2. The method according to claim 1, further comprising:
    storing, in the database, the received bidder response, for subsequent consultation and transmission to other bidders on the first-level.

3. The method according to claim 1, wherein the second level of the third bidder is directly below the hierarchical bidding levels of the first bidder and the second bidder.

4. The method according to claim 1, further comprising:
    automatically segmenting the buyer dossier A items according to a pre-prepared item classification that maximizes the probability of the re-use of responses to quote requests.

5. A method performed by a computer configured by the execution of instructions in one or more programs stored in a non-transitory storage medium for hierarchical multi-level segmentation and estimate reuse request for a bidding system, the method comprising the steps of:
    performing by the computer a process for controlling access to data in the bidding system when: (i) a buyer request for quote A that is associated with buyer dossier A items being put up for quotation is received,
    (ii) a first bid, from a first bidder on a first-level, for quote A1 that includes a quote associated with bidder dossier A1 items which are a subset of the buyer dossier A items is received, (iii) a bidder response which is a response from a third bidder on a second level to the request for quote A1 is received, (iv) a second request for quote A2 that includes a quote associated with bidder dossier A2 items which are another subset of the buyer dossier A items is transmitted by a second bidder on the first-level; and controlling access by the second bidder to the bidder response sent to the first bidder, the process including
    determining, by the second bidder referencing a database to which the bidder response from the third bidder on the second-level is sent, whether the bidder dossier A2 items are duplicative of the bidder dossier A1 items,
    automatically or manually transmitting, to the second bidder, a copy of the bidder response sent to the first bidder in a case that the bidder dossier A2 items are duplicative of the bidder dossier A1 items, in response to a request of the second bidder to have access to the copy of the bidder response sent to the first bidder,
    determining whether specific conditions imposed by the third bidder on the second-level are met,
    preventing, in the automatic transmission, the access by the second bidder on the first-level to the copy of the bidder response sent to the first bidder on the first-level when it is determined that the specific conditions imposed by the third bidder on the second-level are not met, and
    preventing, in the manual transmission, the access by the second bidder on the first-level to the copy of the bidder response sent to the first bidder on the first-level, when the third bidder on the second-level determines, upon review of the request for access from the second bidder on the first-level, to block the access by the second bidder on the first-level to the copy of the bidder response sent to the first bidder on the first-level.

6. The method according to claim 5, further comprising:
    storing, in a database, the received bidder response, for subsequent consultation and transmission to other bidders on the first-level.

7. The method according to claim 5, wherein the second level of the third bidder is directly below the hierarchical bidding levels of the first bidder and the second bidder.

8. The method according to claim 5, further comprising:
    automatically segmenting the buyer dossier A items according to a pre-prepared item classification that maximizes the probability of the re-use of responses to quote requests.

9. A data processing system configured by the execution of instructions in one or more programs stored in a non-transitory storage medium for hierarchical multi-level segmentation and estimate reuse request in a bidding system, comprising:

a quote request module configured to request (a) quotes that are associated with buyer dossier items set, from a buyer and (b) quotes that are associated with bidder dossier items sets that are a subsets of the buyer dossier items set, from one or more bidders;

an estimate module configured to receive bidder responses from a third bidder on a second-level which are responses to the quote requests;

an estimate storage module configured to store bidder responses received by the estimate module; and a quote reply module configured to transmit the bidder responses to corresponding quote requests, wherein the quote reply module is configured to perform a process for controlling access by a second bidder of a first level to the bidder response sent by the third bidder to a first bidder of the first level, the process including determining, by the second bidder referencing a database to which the bidder response from the third bidder on the second-level is sent, whether specific bidder dossier items set corresponding to a quote request by a specific bidder is duplicative of one or more bidder dossier items set corresponding to quote requests by other bidders, and automatically or manually transmitting a copy of a bidder response sent to the first bidder, to the second bidder on the first level or other bidders on the first level who have made quote requests that are associated with bidder dossier items sets that are duplicative of the specific bidder dossier items set, in response to a request of the second bidder to have access to the copy of the bidder response sent to the first bidder, determining whether specific conditions imposed by the third bidder on the second-level are met, preventing, in the automatic transmission, the access by the second bidder or other bidders on the first-level to the copy of the bidder response sent to the first bidder on the first-level when it is determined that the specific conditions imposed by the third bidder on the second-level are not met, the third bidder controlling the quote reply module, and preventing, in the manual transmission, the access by the second bidder on the first-level to the copy of the bidder response sent to the first bidder on the first-level, when the third bidder on the second-level determines, upon review of the request for access from the second bidder on the first-level, to block the access by the second bidder on the first-level to the copy of the bidder response sent to the first bidder on the first-level.

10. The system according to claim 9, wherein the estimate storage module is configured to openly permit access to one or more bidder responses stored in the estimate storage module.

11. A data processing system for hierarchical multi-level segmentation and estimate reuse request comprising a processor configured by the execution of instructions in one or more programs stored in a non-transitory storage medium to perform a method including:

performing a process for controlling access to data in the bidding system including when: (i) a buyer request for quote A that is associated with buyer dossier A items being put up for quotation is received, (ii) a first bid, from a first bidder on a first-level, for quote A1 that includes a quote associated with bidder dossier A1 items which are a subset of the buyer dossier A is received, (iii) a second request from a second bidder on the first-level, for quote A2 that includes a quote associated with bidder dossier A2 items which are another subset of the buyer dossier A items is received, (iv) a bidder response which is a response from a third bidder on a second level to the request for quote A1 is received, and controlling access by the second bidder to the bidder response sent to the first bidder, the process including determining, by the second bidder referencing a database to which the bidder response from the third bidder on the second-level is sent, whether the bidder dossier A2 items are substantially the same as the bidder dossier A1 items, and automatically or manually transmitting to the second bidder, a copy of the bidder response sent to the first bidder in a case that the bidder dossier A2 items are duplicative of the bidder dossier A1 items, in response to a request of the second bidder to have access to the copy of the bidder response sent to the first bidder, determining whether specific conditions imposed by the third bidder on the second-level are met, preventing, in the automatic transmission, the access by the second bidder on the first-level to the copy of the bidder response sent to the first bidder on the first-level when it is determined that the specific conditions imposed by the third bidder on the second-level are not met, and preventing, in the manual transmission, the access by the second bidder on the first-level to the copy of the bidder response sent to the first bidder on the first-level, when the third bidder on the second-level determines, upon review of the request for access from the second bidder on the first-level, to block the access by the second bidder on the first-level to the copy of the bidder response sent to the first bidder on the first-level.

12. A data processing system for hierarchical multi-level segmentation and estimate reuse request comprising a processor configured by the execution of instructions in one or more programs stored in a non-transitory storage medium to perform a method including:

performing a process for controlling access to data in the bidding system including when: (i) a buyer request for quote A that is associated with buyer dossier A items being put up for quotation is received (ii) a first bid, from a first bidder on a first-level, for quote A1 that includes a quote associated with bidder dossier A1 items which are a subset of the buyer dossier A items is received, (iii) a second request from a second bidder on the first-level, for quote A2 that includes a quote associated with bidder dossier A2 items which are another subset of the buyer dossier A items is received, (iv) a bidder response which is a response from a third bidder on a second-level to the request for quote A1 is received, controlling access by the second bidder to the bidder response sent to the first bidder, the process including determining, by the second bidder referencing a database to which the bidder response from the third bidder on the second-level is sent, whether the bidder dossier A2 items are duplicative of the bidder dossier A1 items, and automatically or manually transmitting to the second bidder, a copy of the bidder response sent to the first bidder in a case that the bidder dossier A2 items are duplicative of the bidder dossier A1 items, in response to a request of the second bidder to have access to the copy of the bidder response sent to the first bidder, determining whether specific conditions imposed by the third bidder on the second-level are met, preventing, in the automatic transmission, the access by the second bidder on the first-level to the copy of the bidder response sent to the first bidder on the first-level when it is determined that the specific conditions imposed by the third bidder on the second-level are not met, preventing, in the manual transmission, the access by the second bidder on the first-level to the copy of the bidder response sent to the first bidder on the first-level, when the third bidder on the second-level determines, upon review of the request for access from the second bidder on the first-level, to block the access by the second bidder on the first-level to the copy of the bidder response sent to the first bidder on the first-level; and storing in the database the bidder response, for subsequent consultation and transmission to other bidders on the first-level.

13. A data processing system for hierarchical multi-level segmentation and estimate reuse request comprising a processor configured by the execution of instructions in one or more programs stored in a non-transitory storage medium to perform a method including:

performing a process for controlling access to data in the bidding system when: (i) a buyer request for quote A that is associated with buyer dossier A items being put up for quotation is received, (ii) a first bid, from a first bidder on a first-level, for quote A1 that includes a quote associated with bidder dossier A1 items which are a subset of the buyer dossier A items is received, (iii) a bidder response which is a response from a third bidder on a second-level to the request for quote A1 is received, (iv) a second request for quote A2 that includes a quote associated with bidder dossier A2 items which are another subset of the buyer dossier A items is transmitted by a second bidder on the first level, and controlling access by the second bidder to the bidder response sent to the first bidder, including determining, by the second bidder referencing a database to which the bidder response from the third bidder on the second-level is sent, whether the bidder dossier A2 items are duplicative of the bidder dossier A1 items, and automatically or manually transmitting to the second bidder, a copy of the bidder response sent to the first bidder in a case that the bidder dossier A2 items are duplicative of the bidder dossier A1 items, in response to a request of the second bidder to have access to the copy of the bidder response sent to the first bidder, determining whether specific conditions imposed by the third bidder on the second-level are met, preventing, in the automatic transmission, the access by the second bidder on the first-level to the copy of the bidder response sent to the first bidder on the first-level when it is determined that the specific conditions imposed by the third bidder on the second-level are not met, and preventing, in the manual transmission, the access by the second bidder on the first-level to the copy of the bidder response sent to the first bidder on the first-level, when the third bidder on the second-level determines, upon review of the request for access from the second bidder on the first-level, to block the access by the second bidder on the first-level to the copy of the bidder response sent to the first bidder on the first-level.

14. A data processing system for hierarchical multi-level segmentation and estimate reuse request comprising a processor configured by the execution of instructions in one or more programs stored in a non-transitory storage medium to perform a method including:

performing a process for controlling access to data in the bidding system when: (i) a buyer request for quote A that is associated with buyer dossier A items being put up for quotation is received, (ii) a first bid, from a first bidder on a first-level, for quote A1 that includes a quote associated with bidder dossier A1 items which are a subset of the buyer dossier A items is received, (iii) a bidder response which is a response from a third bidder on a second-level to the request for quote A1 is received, (iv) a second request for quote A2 that includes a quote associated with bidder dossier A2 items which are another subset of the buyer dossier A items is transmitted to a second bidder on the first level, and controlling access by the second bidder to the bidder response sent to the first bidder, the process including determining, by the second bidder referencing a database to which the bidder response from the third bidder on the second-level is sent, whether the bidder dossier A2 items are duplicative of the bidder dossier A1 items, and automatically or manually transmitting to the second bidder, a copy of the bidder response sent to the first bidder in a case that the bidder dossier A2 items are duplicative of the bidder dossier A1 items, in response to a request of the second bidder to have access to the copy of the bidder response sent to the first bidder, preventing, in the automatic transmission, the access by the second bidder on the first-level to the copy of the bidder response sent to the first bidder on the first-level when it is determined that the specific conditions imposed by the third bidder on the second-level are not met, preventing, in the manual transmission, the access by the second bidder on the first-level to the copy of the bidder response sent to the first bidder on the first-level, when the third bidder on the second-level determines, upon review of the request for access from the second bidder on the first-level, to block the access by the second bidder on the first-level to the copy of the bidder response sent to the first bidder on the first-level; and storing in the database the bidder response, for subsequent consultation and transmission to other bidders on the first-level.

15. A non-transitory storage medium including program instructions for implementing a data-processing system of hierarchical multi-level segmentation and estimate reuse request, the program instructions stored in the storage medium being executable by a processor to perform a method including:

controlling access to data in the bidding system including when: (i) a buyer request for quote A that is associated with buyer dossier A items being put up for quotation is received, (ii) a first bid, from a first bidder on a first-level, for quote A1 that includes a quote associated with bidder dossier A1 items which are a subset of the buyer dossier A items is received (iii) a second request from a second bidder on the first-level, a second request for quote A2 that includes a quote associated with bidder dossier A2 items which are another subset of the buyer dossier A items is received, (iv) a bidder response which is a response from a third bidder on a second-level to the request for quote A1 is received, and controlling access by the second bidder to the bidder response sent to the first bidder, the process including determining, by the second bidder referencing a database to which the bidder response from the third bidder on the second-level is sent, whether the bidder dossier A2 items are duplicative of the bidder dossier A1 items, and automatically or manually transmitting to the second bidder, a copy of the bidder response sent to the first bidder in a case that the bidder dossier A2 items are duplicative of the bidder dossier A1 items, in response to a request of the second bidder to have access to the copy of the bidder response sent to the first bidder, determining whether specific conditions imposed by the third bidder on the second-level are met, preventing, in the automatic transmission, the access by the second bidder on the first-level to the copy of the bidder response sent to the first bidder on the first-level when it is determined that the specific conditions imposed by the third bidder on the second-level are not met, and preventing, in the manual transmission, the access by the second bidder on the first-level to the copy of the bidder response sent to the first bidder on the first-level, when the third bidder on the second-level determines, upon review of the request for access from the second bidder on the first-level, to block the access by the second bidder on the first-level to the copy of the bidder response sent to the first bidder on the first-level.

16. A non-transitory storage medium including program instructions for implementing a data-processing system of hierarchical multi-level segmentation and estimate reuse request, the program instructions stored in the storage medium being executable by a processor to perform a method including:

performing a process for controlling access to data in the bidding system including when: (i) a buyer request for quote A that is associated with buyer dossier A items being put up for quotation is received (ii) a first bid, from a first bidder on a first-level, for quote A1 that includes a quote associated with bidder dossier A1 items which are a subset of the buyer dossier A items is received, (iii) a second request from a second bidder on the first-level, a second request for quote A2 that includes a quote associated with bidder dossier A2 items which are another subset of the buyer dossier A items is received, (iv) a bidder response which is a response from a third bidder on a second-level to the request for quote A1; and controlling access by the second bidder to the bidder response sent to the first bidder, the process including determining, by the second bidder referencing a database to which the bidder response from the third bidder on the second-level is sent, whether the bidder dossier A2 items are duplicative of the bidder dossier A1 items, and automatically or manually transmitting to the second bidder, a copy of the bidder response sent to the first bidder in a case that the bidder dossier A2 items are duplicative of the bidder dossier A1 items, in response to a request of the second bidder to have access to the copy of the bidder response sent to the first bidder, determining whether specific conditions imposed by the third bidder on the second-level are met, preventing, in the automatic transmission, the access by the second bidder on the first-level to the copy of the bidder response sent to the first bidder on the first-level when it is determined that the specific conditions imposed by the third bidder on the second-level are not met, and preventing, in the manual transmission, the access by the second bidder on the first-level to the copy of the bidder response sent to the first bidder on the first-level, when the third bidder on the second-level determines, upon review of the request for access from the second bidder on the first-level, to block the access by the second bidder on the first-level to the copy of the bidder response sent to the first bidder on the first-level; and storing in the database the bidder response, for subsequent consultation and transmission to other bidders on the first-level.

17. A non-transitory storage medium including program instructions for implementing a data-processing system of hierarchical multi-level segmentation and estimate reuse request, the program instructions stored in the storage medium being executable by a processor to perform a method including:

performing a process for controlling access to data in the bidding system when: (i) a buyer request for quote A that is associated with buyer dossier A items being put up for quotation is received, (ii) a first bid, from a first bidder on a first-level, a for quote A1 that includes a quote associated with bidder dossier A1 items which are a subset of the buyer dossier A items is received, (iv) a bidder response which is a response from a third bidder on a second-level to the request for quote A1 is received, transmitting to a second bidder on the first level a second request for quote A2 that includes a quote associated with bidder dossier A2 items which are another subset of the buyer dossier A items; and controlling access by the second bidder to the bidder response sent to the first bidder, the process including determining, by the second bidder referencing a database to which the bidder response from the third bidder on the second-level is sent, whether the bidder dossier A2 items are duplicative of the bidder dossier A1 items, and automatically or manually transmitting to the second bidder, a copy of the bidder response sent to the first bidder in a case that the bidder dossier A2 items are duplicative of the bidder dossier A1 items, in response to a request of the second bidder to have access to the copy of the bidder response sent to the first bidder determining whether specific conditions imposed by the third bidder on the second-level are met, preventing, in the automatic transmission, the access by the second bidder on the first-level to the copy of the bidder response sent to the first bidder on the first-level when it is determined that the specific conditions imposed by the third bidder on the second-level are not met, and preventing, in the manual transmission, the access by the second bidder on the first-level to the copy of the bidder response sent to the first bidder on the first-level, when the third bidder on the second-level determines, upon review of the request for access from the second bidder on the first-level, to block the access by the second bidder on the first-level to the copy of the bidder response sent to the first bidder on the first-level.

\* \* \* \* \*